United States Patent
Wang et al.

(10) Patent No.: US 12,342,206 B2
(45) Date of Patent: Jun. 24, 2025

(54) METHOD AND DEVICE FOR CONFIGURATION OF MINIMIZATION OF DRIVE TESTS

(71) Applicant: Samsung Electronics Co., Ltd., Gyeonggi-do (KR)

(72) Inventors: Hong Wang, Beijing (CN); Lixiang Xu, Beijing (CN); Weiwei Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 395 days.

(21) Appl. No.: 17/927,156

(22) PCT Filed: May 21, 2021

(86) PCT No.: PCT/KR2021/006333
§ 371 (c)(1),
(2) Date: Nov. 22, 2022

(87) PCT Pub. No.: WO2021/235886
PCT Pub. Date: Nov. 25, 2021

(65) Prior Publication Data
US 2023/0199541 A1    Jun. 22, 2023

(30) Foreign Application Priority Data

May 22, 2020   (CN) .......................... 202010444297.6
May 27, 2020   (CN) .......................... 202010463671.7
(Continued)

(51) Int. Cl.
*H04W 24/10* (2009.01)

(52) U.S. Cl.
CPC .................................. *H04W 24/10* (2013.01)

(58) Field of Classification Search
CPC ...................................................... H04W 24/10
See application file for complete search history.

(56) References Cited

U.S. PATENT DOCUMENTS

2013/0279357 A1   10/2013   Gao
2015/0126130 A1    5/2015   Hong et al.
(Continued)

FOREIGN PATENT DOCUMENTS

CN    102457890    5/2012
CN    102938905    2/2013
(Continued)

OTHER PUBLICATIONS

Qualcomm Incorporated, "Logged MDT Configuration and Reporting for MR-DC", R3-195485, 3GPP TSG-RAN WG3 Meeting #105bis, Oct. 14-18, 2019, 3 pages.
(Continued)

*Primary Examiner* — Curtis B Odom
(74) *Attorney, Agent, or Firm* — The Farrell Law Firm, P.C.

(57) ABSTRACT

The present disclosure provides a method and device for configuration of minimization of drive tests, in which a first node sends MDT status information to a second node; and the second node decides whether it is possible to configure a management-based logged MDT measurement for a UE. It is avoided that the MDT configuration information that is currently still valid is erroneously overwritten when the network reconfigures the MDT for the UE.

18 Claims, 10 Drawing Sheets

(30) Foreign Application Priority Data

Aug. 5, 2020 (CN) .......................... 202010777826.4
Dec. 22, 2020 (CN) .......................... 202011535071.3

(56) References Cited

U.S. PATENT DOCUMENTS

2017/0064573 A1* 3/2017 Rácz ................. H04W 4/023
2020/0329394 A1 10/2020 Kimba Dit Adamou et al.
2021/0076242 A1 3/2021 Hong
2021/0400519 A1 12/2021 Kimba Dit Adamou et al.

FOREIGN PATENT DOCUMENTS

| CN | 103037349 | 4/2013 |
|----|-----------|--------|
| CN | 103037426 | 4/2013 |
| CN | 109818770 | 5/2019 |
| CN | 109819468 | 5/2019 |
| CN | 110958633 | 4/2020 |
| EP | 2 360 961 | 8/2011 |
| WO | WO 2013/191431 | 12/2013 |
| WO | WO 2019/101125 | 5/2019 |
| WO | WO 2019/140684 | 7/2019 |

OTHER PUBLICATIONS

Qualcomm Incorporated, "Signalling Based MDT Configuration Handling for RRC_Inactive", R2-1912574, 3GPP TSG-RAN WG2 Meeting #107bis, Oct. 14-18, 2019, 4 pages.
Alcatel-Lucent, "Discussion Paper on MBSFN MDT Support", S5-151128, 3GPP TSG SA WG5 (Telecom Management) Meeting #99, Feb. 2-6, 2015, 3 pages.
Jia-ming Chen, "Research on Technology Application of Immediate MDT Data Source Based on Management", https://www.cnki.net, Nov. 2018, 7 pages.
Chinese Office Action dated Aug. 14, 2024 Issued in counterpart application No. 202011535071.3, 36 pages.
PCT/ISA/210 Search Report issued on PCT/KR2021/006333, Aug. 26, 2021, pp. 3.
PCT/ISA/237 Written Opinion issued on PCT/KR2021/006333, Aug. 26, 2021, pp. 4.
3GPP TS 37.320 V16.0.0 Technical Specification, 3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16), Apr. 7, 2020, pp. 36.
Ericsson, "Summary of Offline Discussions CB: # 32_Email032_MDT_inactiveUEs", 3GPP TSG-RAN3 Meeting #107-e R3-201135 Online, Feb. 28, 2020, pp. 9.
Ericsson, "Corrections to TS 37.320", 3GPP TSG-RAN WG2 #110e R2-2004713 Electronic meeting, May 21, 2020, pp. 9.

* cited by examiner

[Fig. 2]
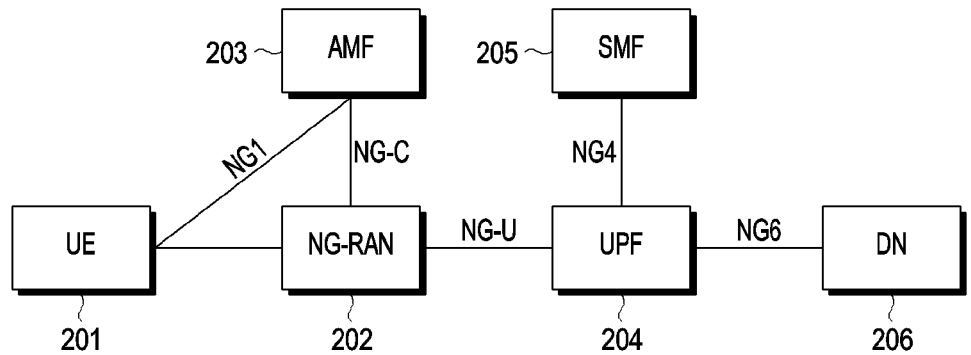
[Fig. 3]
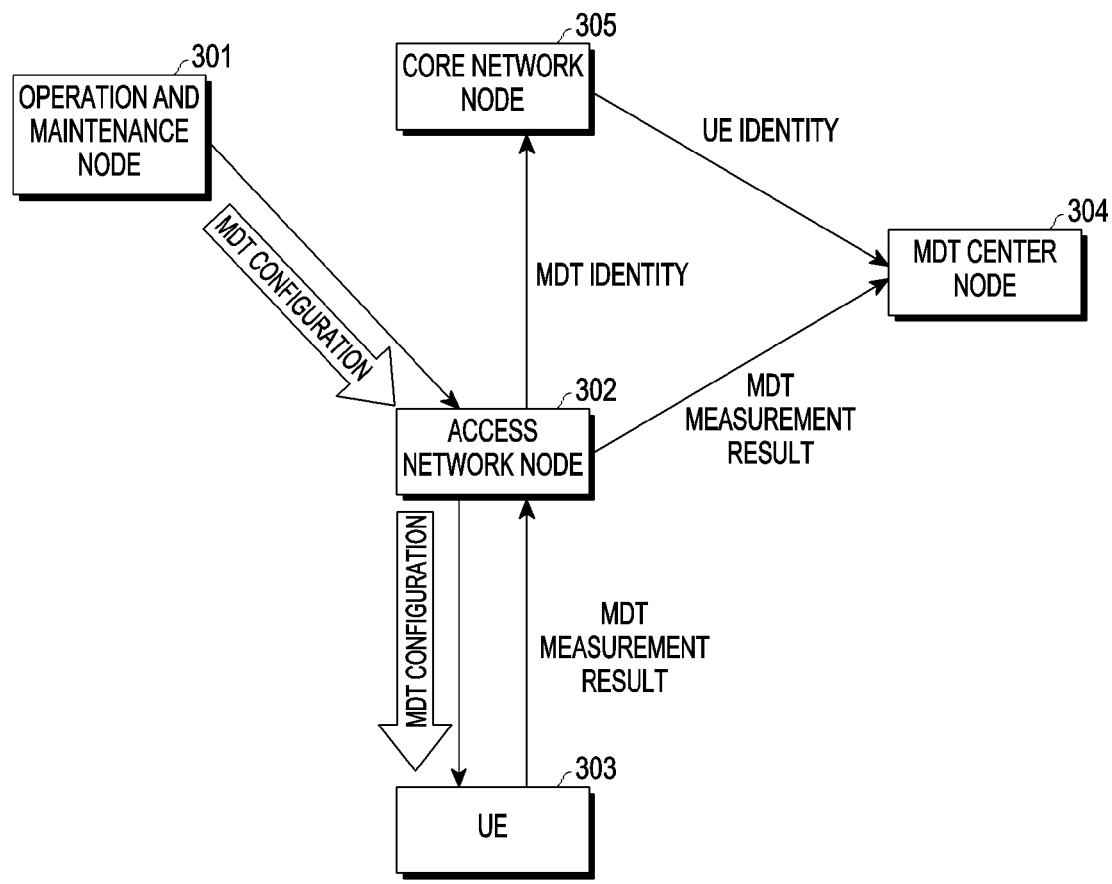

[Fig. 4]
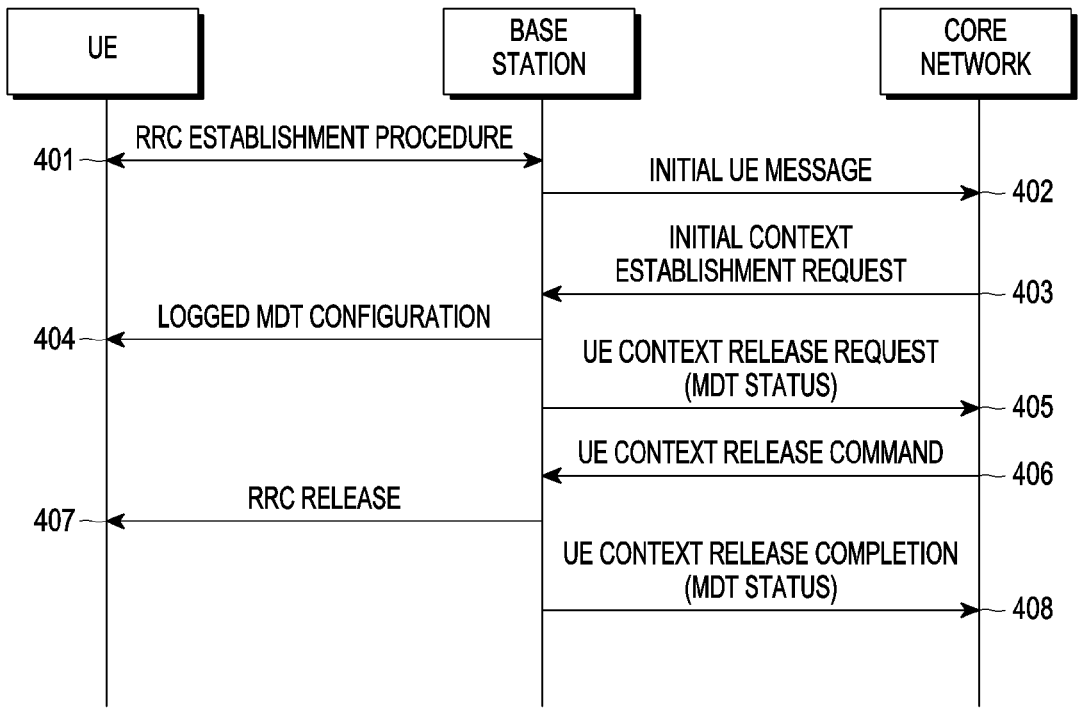
[Fig. 5]
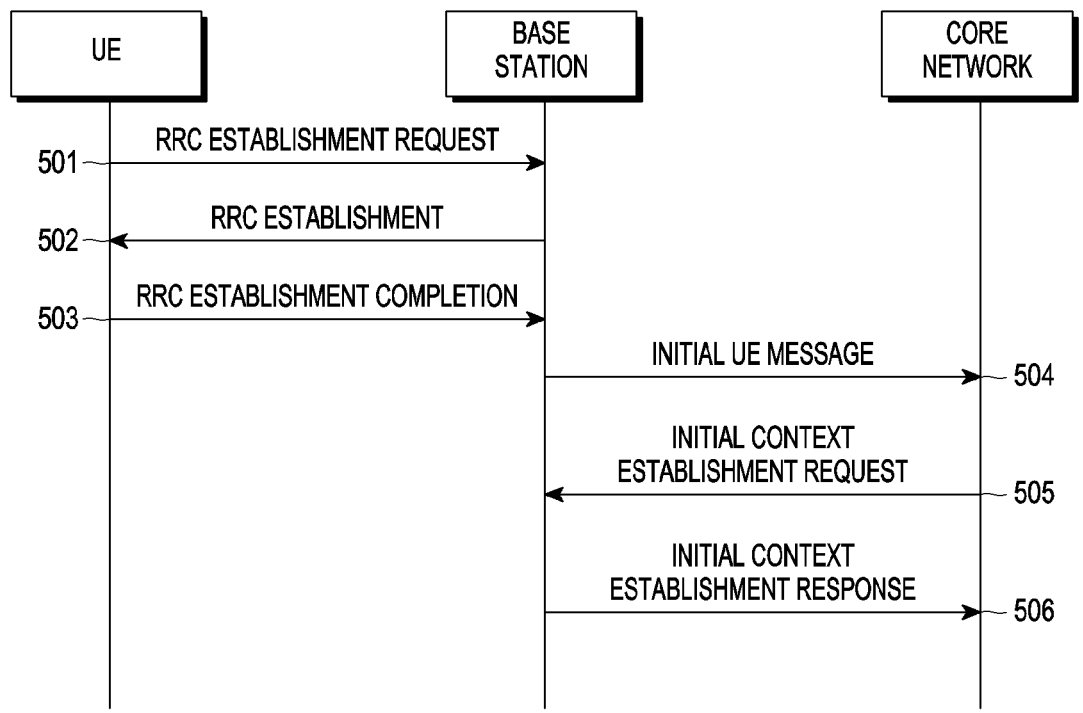

[Fig. 6]
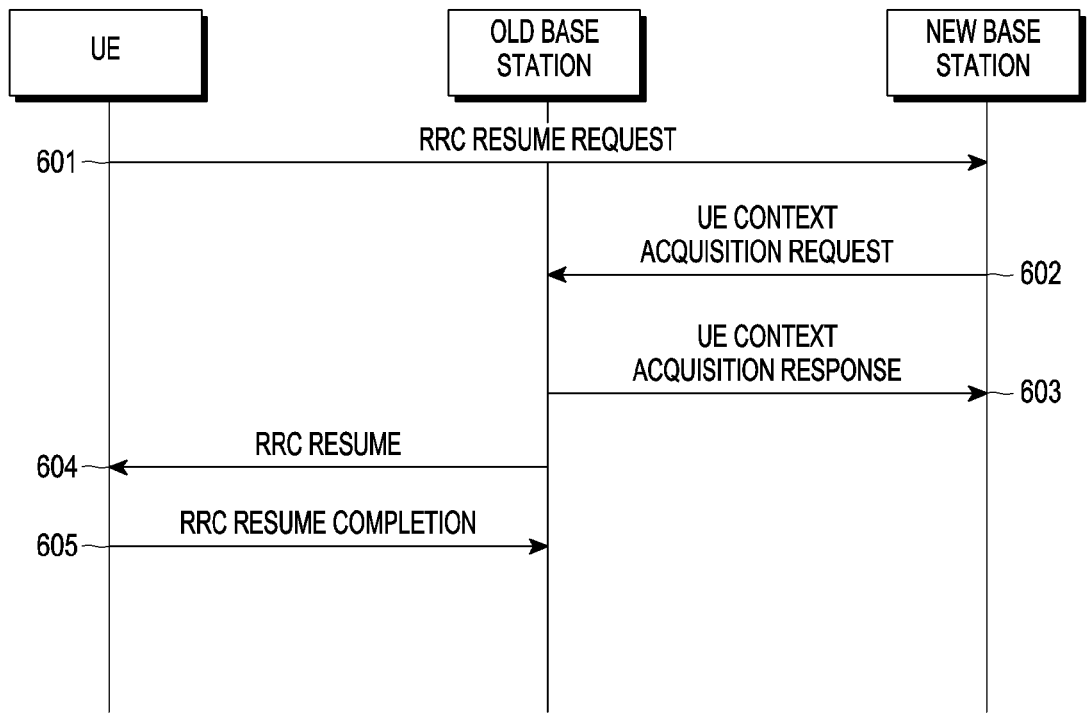
[Fig. 7]
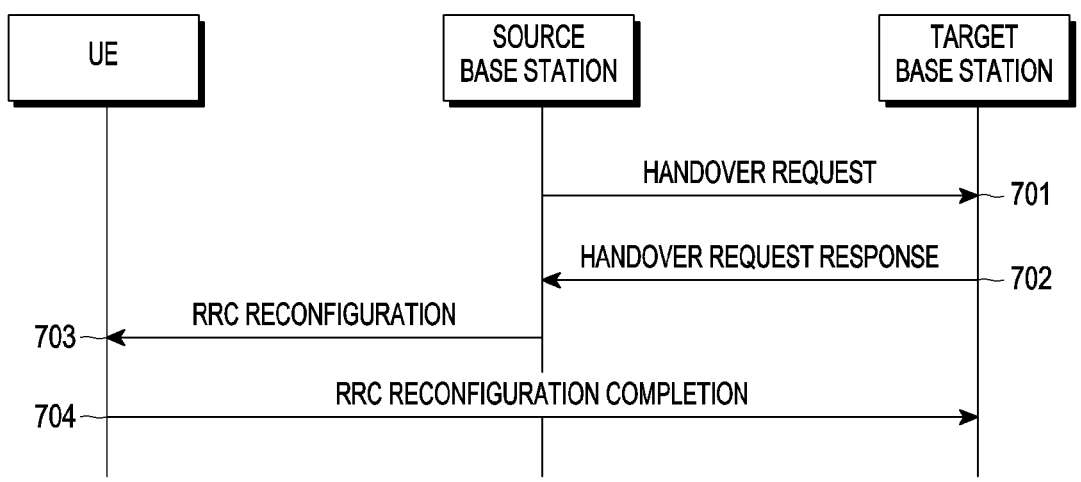

[Fig. 9]
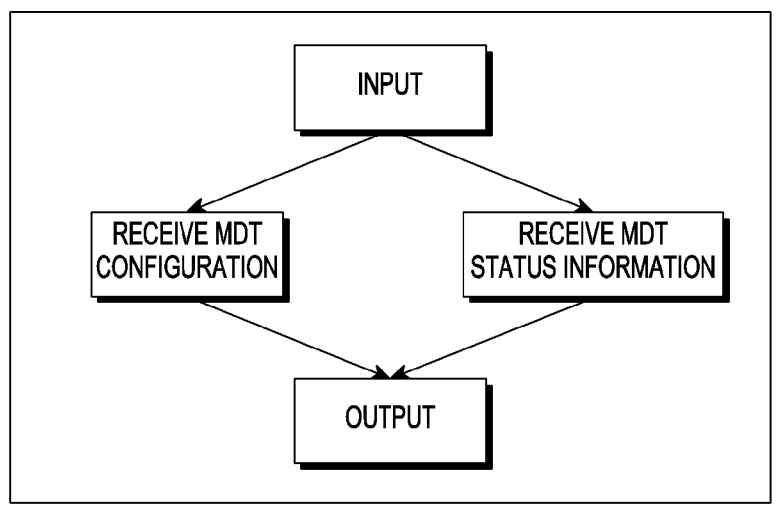
[Fig. 10]
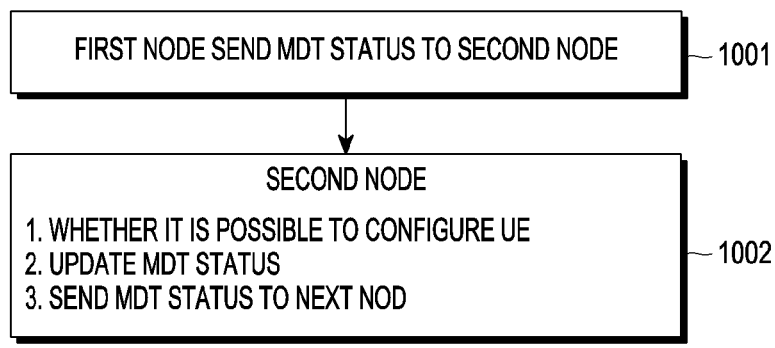

[Fig. 12]

[Fig. 14]
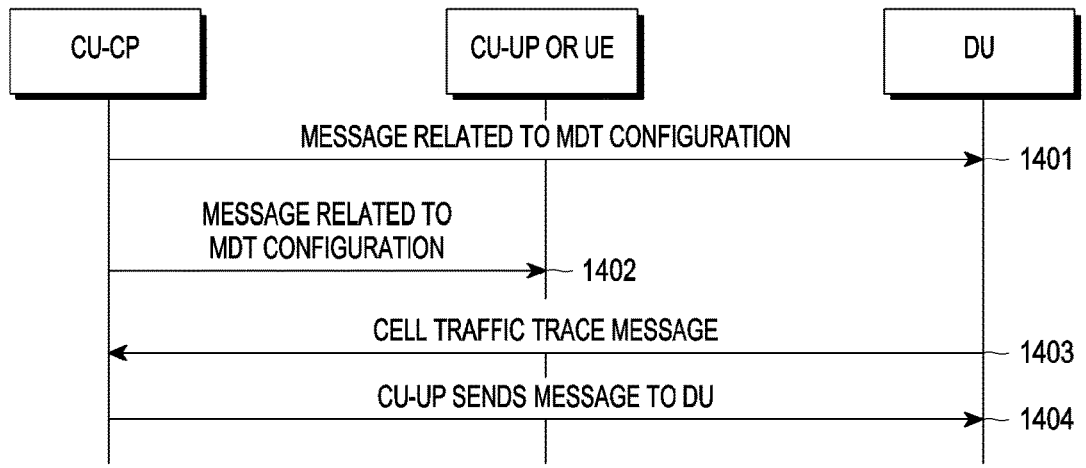
[Fig. 15]
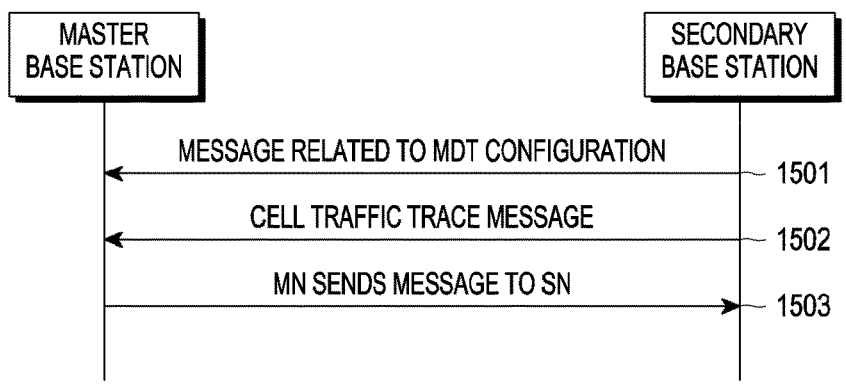
[Fig. 16]
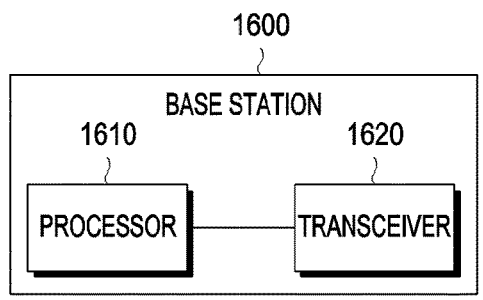
[Fig. 17]
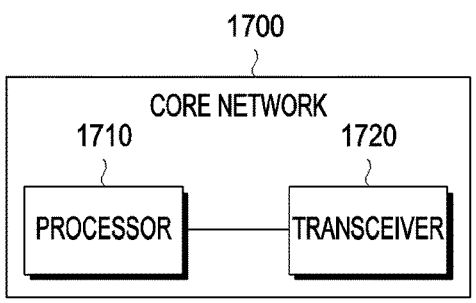

METHOD AND DEVICE FOR CONFIGURATION OF MINIMIZATION OF DRIVE TESTS

CROSS-REFERENCE TO RELATED APPLICATION(S)

This application is a National Phase Entry of PCT International Application No. PCT/KR2021/006333, which was filed on May 21, 2021, and claims priority to Chinese Applications No. 202010444297.6, 202010463671.7, 202010777826.4, and 202011535071.3 filed in the Chinese Intellectual Property Office on May 22, 2020, May 27, 2020, Aug. 5, 2020 and Dec. 22, 2020, respectively, the entire disclosure of each of which is incorporated herein by reference.

TECHNICAL FIELD

The present disclosure relates to wireless communication technology, in particular to a method and device for configuration of measurement of minimization of drive tests.

BACKGROUND ART

Modern mobile communications increasingly tend to provide users with multimedia services transmitted at a high rate. As shown in FIG. 1, it is a system architecture diagram of System Architecture Evolution (SAE), in which:

A User Equipment (UE) 101 is a terminal device for receiving data. An Evolved Universal Terrestrial Radio Access Network (E-UTRAN) 102 is a radio access network, which includes a macro base station (eNodeB/NodeB) that provides the UE with an interface for accessing to the radio network. A Mobility Management Entity (MME) 103 is responsible for managing the UE's mobility context, session context and security information. A Serving Gateway (SGW) 104 mainly provides user plane functions, and the MME 103 and the SGW 104 may be at the same physical entity. A Packet data network Gateway (PGW) 105 is responsible for functions such as charging, lawful interception, etc., and may also be at the same physical entity together with the SGW 104. A Policy and Charging Rules Function entity (PCRF) 106 provides Quality of Service (QOS) policy and charging criteria. A Serving GPRS Support Node (SGSN) 108 is a network node device that provides routing for data transmission in the Universal Mobile Telecommunication System (UMTS). A Home Subscriber Server (HSS) 109 is the home sub-system of the UE, and is responsible for protecting user information including the current location of the user equipment, the address of the serving node, user security information, the packet data context of the user equipment and so on.

As shown in FIG. 2, it is a system architecture diagram of the next-generation network or the fifth-generation 5G network, in which:

A User Equipment (UE) 201 is a terminal device for receiving data. A Next Generation Radio Access Network (NG-RAN) 202 is a radio access network, which includes a base station (a gNB or an eNB connected to a 5G core network 5GC, and the eNB connected to the 5GC is also called ng-eNB) that provides the UE with an interface for accessing to the radio network. An Access control and Mobility management Function entity (AMF) 203 is responsible for managing the UE's mobility context and security information. A User Plane Function entity (UPF) 204 mainly provides user plane functions. A Session Management Function entity (SMF) 205 is responsible for session management. A Data Network (DN) 206 contains services such as operator services, access to Internet, third-party services and so on.

DISCLOSURE OF INVENTION

Solution to Problem

According to one aspect of the present application, there is provided a method for configuration of minimization of drive tests (MDT), which is performed by a second node, comprising: receiving by the second node MDT status information transmitted by a first node; deciding by the second node whether it is possible to configure a management-based logged MDT measurement for a user equipment (UE), or to continue to calculate the remaining duration contained in the MDT status information, or to transmit the MDT status information to a third node.

The first node is a base station or a core network node.

The second node is a base station or a core network.

The MDT status information contains indication information. The indication information can indicate at least one of the following:

an MDT measurement is configured for the UE, a logged MDT measurement is configured for the UE, a signaling-based MDT measurement is configured for the UE, a signaling-based logged MDT measurement is configured for the UE, and a management-based logged MDT measurement is configured for the UE.

The MDT status information further contains at least one of the following of the MDT: the unique identity of the MDT, the type of the MDT that has been configured, the configuration time containing the logged MDT, the logging duration containing the logged MDT, and the remaining duration of the logged MDT.

According to another aspect of the present application, there is provided a method for configuration of minimization of drive tests (MDT), comprising: determining by a first node MDT status information; transmitting by the first node the MDT status information to a second node, so that the second node decides whether it is possible to configure a management-based logged MDT measurement for a user equipment (UE), or to continue to calculate the remaining duration contained in the MDT status information, or to transmit the MDT status information to a third node.

According to another aspect of the present application, there is provided a node, comprising: a transceiver, for transmitting and receiving a signal; a processor for controlling the node to execute the method for a second node according to various aspects of the present application.

According to another aspect of the present application, there is provided a node, comprising: a transceiver, for transmitting and receiving a signal; a processor for controlling the node to execute the method for a first node according to various aspects of the present application.

BRIEF DESCRIPTION OF DRAWINGS

FIG. 2 is an architecture diagram of an existing 5G system.

FIG. 3 is a schematic diagram of a MDT measurement structure.

FIG. 4 is a schematic flowchart of Embodiment 1 of the present disclosure.

FIG. 5 is a schematic flowchart of Embodiment 2 of the present disclosure.

FIG. 6 is a schematic flowchart of Embodiment 3 of the present disclosure.

FIG. 7 is a schematic flowchart of Embodiment 4 of the present disclosure.

FIG. 9 is a schematic diagram of a device of the present disclosure.

FIG. 10 is a schematic diagram of a method of the present disclosure.

FIG. 14 is a schematic flowchart of Embodiment 9 of the present disclosure.

FIG. 15 is a schematic flowchart of Embodiment 10 of the present disclosure.

FIG. 16 illustrates a structure of a base station (BS) according to an embodiment of the present disclosure.

FIG. 17 illustrates a structure of a core network according to an embodiment of the present disclosure.

MODE FOR THE INVENTION

Figure 1:
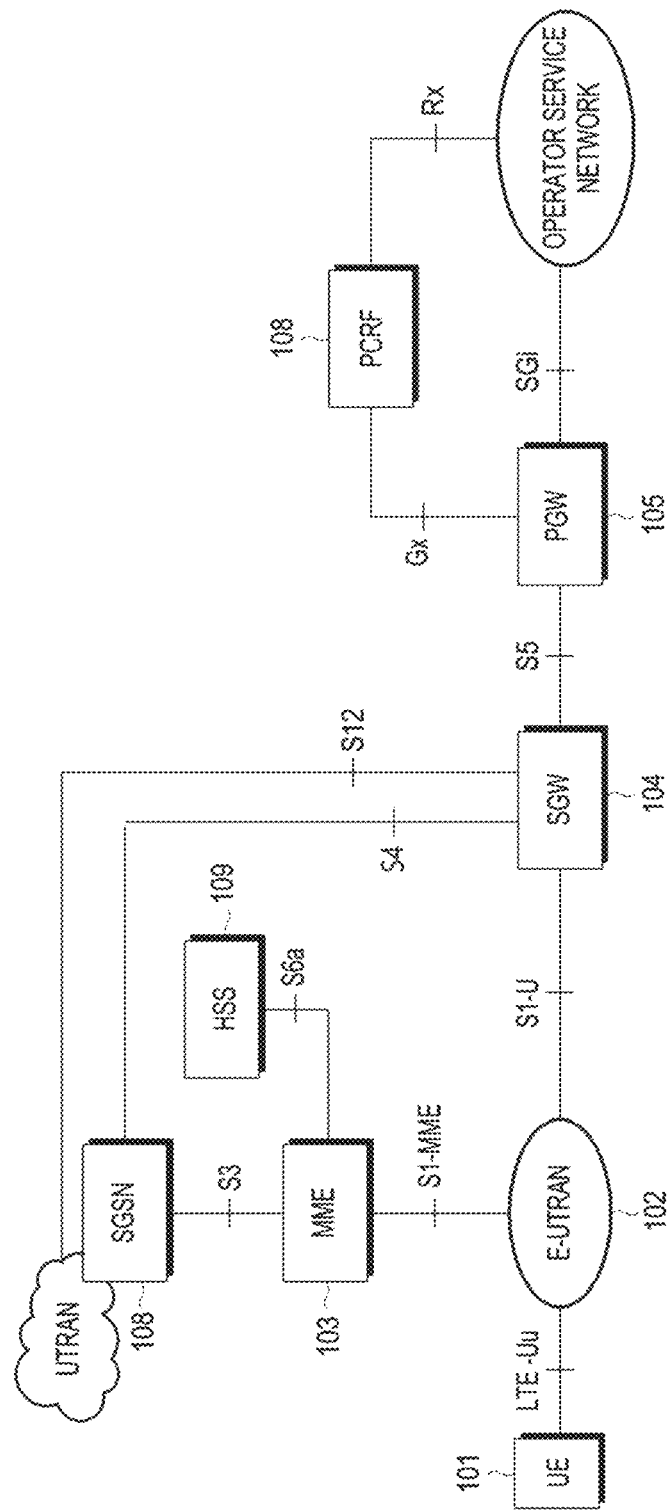
FIG. 1 is an architecture diagram of an existing LTE system.

In order to make the purpose, technical schemes and advantages of the application more clear, the application will be further described in detail below in conjunction with the accompanying drawings. It should be noted that the following description is only for illustration and not for limiting the present disclosure. In the following description, in order to provide thorough understanding of the present disclosure, numerous specific details are set forth. However, it is obvious to those ordinary skills in the art that it is not necessary to adopt these specific details to implement the present disclosure. In other instances, in order to avoid obscuring the present disclosure, well-known circuits, materials or methods are not specifically described.

Throughout the specification, references to "one embodiment", "embodiment", "an example" or "example" mean that a specific feature, structure or characteristic described in conjunction with the embodiment or example is contained in at least one embodiment of the present disclosure. Therefore, the phrases "in one embodiment", "in an embodiment", "one example" or "example" appearing in various places throughout the specification do not necessarily all refer to the same embodiment or example. In addition, specific features, structures or characteristics may be combined in one or more embodiments or examples with any suitable combination and/or sub-combination. In addition, those ordinary skills in the art should understand that the accompanying drawings provided herein are all for illustrative purposes, and the accompanying drawings are not necessarily drawn to scale. The term "and/or" used herein includes any and all combinations of one or more of the associated listed items.

Minimization of drive tests (MDT) is to let base stations or users to perform some measurements and transmit the measurement results to a measurement center node, for example, a TCE (Trace Collection Entity) node, to reduce the burden of manual testing. The MDT measurement should support real-time and non-real-time measurement. The core network (or first node) or the operation and maintenance node (or third node) sends a message of MDT activation to a access network node (or second node), and the message carries specific MDT measurement configuration, for example, a measurement type, a measurement period, a threshold, a reporting period or threshold and so on. Some MDT measurement types require the UE to perform the measurement. For these measurement types, an access network node sends an RRC message to the UE, configures the UE to perform the MDT measurement, and the UE reports the measurement result to the access network node. Some MD measurement types require the base station to perform the measurement. For these measurement types, the base station performs the MDT measurement according to specific configuration information. The access network sends the measurement result, including the result of measurement performed by the UE and the result of measurement performed by the base station, to the measurement center node.

According to the way that the MDT is initiated, the MDT can be divided into a management-based MDT and a signaling-based MDT. The management-based MDT means that the access network entity receives a message of MDT activation from the operation and maintenance node, while the signaling-based MDT means that the access network entity receives a message of MDT activation from the core network entity, for example, a mobility management entity.

According to the state of the UE, the MDT measurement performed by the UE in RRC connected state is called immediate MDT, while the MDT measurement performed by the UE in RRC idle state or RRC inactive state (RRC-inactive) is called logged MDT.

FIG. 3 describes a structural diagram of the management-based MDT. 301 represents an operation and maintenance node (Element Management, abbreviated as EM). The operation and maintenance node 301 sends an MDT activation request message to an access network node 302. The access network node 302 can be an eNB of the 4G system or a gNB or eNB of the 5G system, or a base station in other systems. The MDT activation request message contains the configuration information of the MDT. The MDT configuration information mainly contains information such as MDT location selection condition, reporting mechanism configuration, Trace Reference (TR), IP address of the MDT measurement center node (for example, TCE), a job type, MDT data anonymity and so on. The above job type can be configured into different types, for example, currently defined as four types: Immediate MDT only, Logged MDT only, Trace only, Immediate MDT and Trace. defining more types or simplified types are not excluded. The MDT location selection condition configures at which locations UEs can be selected as users of MDT measurement. The location selection condition can be configured as a range of a cell, or a range of a TAC, or the entire PLMN. A UE within the range can be selected as a UE for MDT. The TR uniquely identifies an MDT procedure. In an MDT procedure, the base station can select multiple users to perform MDT measurement.

The access network node 302 selects the UE for MDT measurement. When the access network node selects the UE, it must follow certain conditions, for example, considering whether the user agrees to perform the measurement and/or whether the UE is located within the MDT location in the MDT configuration information. If the UE does not agree with the MDT, or the UE does not meet the location selection condition, the UE cannot be selected as the UE for MDT. After the UE is selected, if the UE needs to perform the measurement, the access network node 302 sends the MDT configuration information to the UE 303. The UE 303 performs the MDT measurement according to the configuration, and sends the measurement result to the network node, i.e. the access network node 302, when the reporting condition is met. The access network node 302 needs to send an MDT trace message to a core network entity 305. The core network entity may be an MME (Mobility Management Entity) of 4G, an AMF (Access and Mobility Management Function) of 5G, or a core network entity connected to the access network in other systems. The message contains at least the identity of the MDT and the IP address of the TCE. The core network entity 305 finds the unique identity of the UE, for example, IMSI or IMEI (SV), and sends the unique identity to the TCE. The access network node 302 saves the MDT measurement result, also called MDT record, and according to a predefined strategy, the access network node 302 sends the MDT records to the MDT center node 304 (for example, a Trace Collection Entity (TCE)). The MDT center node 304 can know for which UEs the MDT logs are in conjunction with the information sent by the core network entity.

The difference of the signaling-based MDT is that the MDT start message is sent from the core network entity to the access network entity, and that the MDT configuration information is allocated by the core network entity.

FIG. 10 is a schematic diagram of a method of the present disclosure. Through this method, erroneously overwriting the MDT configuration information that is currently still valid when the network reconfigures the MDT for the UE is avoided.

At step 1001, a first node sends the MDT status information to a second node.

The first node may be a 3G base station, a 4G base station, a 5G base station or a base station of other systems, or a 3G core network, a 4G core network or a 5G core network. The second node may be a 3G base station, a 4G base station, a 5G base station or a base station of other systems, or a 3G core network, a 4G core network or a 5G core network.

The MDT status information can contain status indication, for example, including one or more of the following statuses:
  indicating whether the MDT measurement is configured for the UE;
  indicating whether the logged MDT measurement is configured for the UE;
  indicating whether the signaling-based MDT measurement is configured for the UE;
  indicating whether the signaling-based logged MDT measurement is configured for the UE;
  indicating whether the management-based logged MDT measurement is configured for the UE.

The MDT status information may contain the unique identity of the MDT that has been configured, for example, TR (Trace Reference), TRSR (Trace Recording Session Reference).

The MDT status information may contain the type of MDT that has been configured, for example, the management-based logged MDT, the signaling-based logged MDT.

The MDT status information may contain a first timestamp. The timestamp is the time when the logged MDT is configured, for example, the time when the signaling-based logged MDT is configured. The configuration time is the absolute time of the base station when the base station sends the RRC message of the logged MDT configuration to the UE, for example, it is identified in the form of year-month-day hour-minute-second. This time is the same as the absolute time contained in the RRC message of the logged MDT configuration sent by the base station to the UE.

The MDT status information can contain the logging duration of the logged MDT, for example, the logging duration of the signaling-based logged MDT. This logged MDT has been configured in the UE, and the logging duration parameter is sent by the core network to the base station, and then sent by the base station to the UE. The value of the parameter is the same as the logging duration contained in the RRC message sent to the UE.

The MDT status information may also contain a second timestamp which is the remaining duration of the logged MDT, and the remaining duration may be the remaining duration of the signaling-based logged MDT measurement, and/or the remaining duration of the management-based logged MDT measurement.

At step 1002, the second node decides one or more of the following actions according to the MDT status information:
  1) deciding whether the management-based logged MDT can be configured for the UE;
  2) calculating the MDT status information;
  3) sending the MDT status information to the next node.

According to the MDT status information, the second node decides whether the signaling-based logged MDT measurement can be configured for the UE. For example, if the MDT status information indicates that the signaling-based logged MDT measurement has been configured for the UE, and/or the base station knows, through the timestamp contained in the MDT status information, that the UE has been configured with the signaling-based logged MDT measurement, and the measurement has not expired, then the second node cannot configure the management-based logged MDT measurement for the UE, and if it has expired, then the management-based logged MDT measurement can be configured for the UE.

According to the configuration time of the logged MDT, with reference to the MDT configuration parameter, the second node decides whether the management-based logged MDT measurement can be configured for the UE.

The second node continues to calculate the remaining duration contained in the MDT status information. If the remaining duration is 0, the second node can delete the corresponding MDT status information.

The second node can send the MDT status information or the updated MDT status information to the next node. The next node can be a 3G base station, a 4G base station, a 5G base station or a base station of other systems, or a 3G core network, a 4G core network or a 5G core network.

Through the method of the present disclosure, erroneously overwriting the MDT configuration information that is currently still valid when the network reconfigures the MDT for the UE is avoided.

Embodiment 1

FIG. 4 describes Embodiment 1 of the present disclosure. The UE in RRC connected mode is configured with the signaling-based logged MDT measurement or the management-based logged MDT measurement. After that, the UE enters the RRC idle mode, and the base station reports the MDT status to the core network which saves the MDT status information for future procedures.

Specifically, FIG. 4 may include the following steps.

Step 401: an RRC connection is established between a UE and a base station.

The base station can be a 3G base station, a 4G base station or a 5G base station, or a base station of other access systems. The procedure of establishing the RRC connection adopts the current procedure, which includes the following three steps. After the RRC connection is established, the UE enters the RRC connected mode. The context information of the UE is saved on the base station.

1. The UE initiates the establishment of the RRC connection and sends an RRC establishment request message to the DU. The message carries the UE's temporary identifier and the cause for the RRC establishment.
2. A RRC establishment message is sent to the UE.
3. A RRC connection establishment completion message carries the operator identity (for example, PLMN ID) selected by the UE. The message also contains a non-access stratum message. After receiving it, the base station sends the non-access stratum message to a core network mobility function node AMF.

Step 402: The base station sends an initial UE message to the core network.

After the base station receives the RRC connection establishment completion message, the base station sends the "initial UE message" to the core network through the interface with the core network. The core network may be a 3G core network, a 4G core network, a 5G core network or a core network of other systems, and the message carries the non-access stratum message carried in the RRC connection establishment completion message by the UE. The message also carries the location information of the UE, for example, the unique identity of the cell, where the UE is located, in the entire network. The message contains the UE's temporary identity, which is allocated to the UE by the core network, for example, the 5G-S-TMSI allocated to the UE by the 5G core network.

Step 403: The core network sends an initial context establishment request message to the base station.

The core network receives the message of step 402, and can find the context information of the UE according to the temporary identity of the UE. Thus, the capability information of the UE is obtained. The UE sends the initial context establishment request message to the base station, and the message contains the information of the data bearer established for the UE, containing the UE's encryption capability information and radio access capability information. In this message, it is also possible to configure Trace or MDT measurement for the UE. The core network can also configure Trace or MDT measurement for the UE through a separate Trace activation procedure after the UE context of the base station is established.

MDT measurement parameters contain the identity of the measurement, for example, TRSR, the identity of TCE (TCE ID), the measurement area configuration, and whether the measurement is logged or immediate, and if it is logged, it also contains information such as the duration of measurement, whether the type of reporting is periodic or event triggered, the type of measurement and so on. The duration of measurement indicates the length of time when the UE needs to perform the measurement, for example, it can be set to 10 minutes, 2 hours, etc.

After step 403 is completed, the base station can send a response message of success to the core network.

Step 404: The base station sends the MDT configuration to the UE.

When the MDT measurement of the core network is received, if the UE is required to perform measurement, for example, the MDT measurement is logged MDT, it needs to be configured in advance to the UE. The MDT measurement is started when the UE enters the idle mode or the RRC-inactive mode. The base station sends to the UE an RRC message, for example, a logged measurement configuration message, and the message carries configuration parameters of the MDT measurement. The measurement configuration parameters contain information such as the identity of the measurement, for example, the TRSR and the identity of TCE (TCE ID), the measurement area configuration, a network absolute timestamp for providing a reference for the absolute time of the current cell for the UE, the duration of the MDT measurement, and whether the type of reporting is periodic or event triggered, the type of measurement and so on. The duration of measurement indicates the length of time when the UE needs to perform the measurement, for example, it can be set to 10 minutes, 2 hours, etc. After the UE receives the MDT configuration, it begins to start the clock corresponding to the measurement time. When the UE's state changes or it moves outside the measurement range, the clock continues to operate until the duration of the MDT measurement expires, the clock stops, logging of the MDT is also stopped, and the corresponding configuration can also be cleared.

Step 405: The base station sends a UE context release request message to the core network.

The base station decides to release the RRC connection of the UE and let the UE enter the RRC idle mode, and the base station sends the UE context release request message to the core network. The message carries the interface identity allocated by the base station for the UE, the interface identity allocated by the core network for the UE, and contains the cause for the release. If the logged MDT measurement has been configured for the UE, the message can also contain the MDT status information, and the MDT status information can contain status indication, for example, being one or more of the following statuses:

indicating whether the MDT measurement is configured for the UE;
indicating whether the logged MDT measurement is configured for the UE;
indicating whether the signaling-based MDT measurement is configured for the UE;
indicating whether the signaling-based logged MDT measurement is configured for the UE;
indicating whether the management-based logged MDT measurement is configured for the UE.

The MDT status information may contain the unique identity of the MDT that has been configured, for example, the TR (Trace Reference), the TRSR (Trace Recording Session Reference).

The MDT status information may contain the type of MDT that has been configured, for example, the management-based logged MDT, the signaling-based logged MDT.

The MDT status information may also contain a first timestamp. The timestamp is the configuration time of the logged MDT, for example, the configuration time of the signaling-based logged MDT. The configuration time is the absolute time of the cell when the base station sends the RRC message of the logged MDT configuration to the UE, for example, it is identified in the form of year-month-day hour-minute-second. The configuration time of the logged MDT contained in the MDT status information is the same as the time contained in the RRC message of the logged MDT configuration sent by the base station to the UE.

The MDT status information can also contain the logging duration of the logged MDT, for example, the logging duration of the signaling-based logged MDT. This logged MDT has been configured in the UE, and the parameter is sent by the core network to the base station, and sent by the base station to the UE. The value of the parameter is the same as the logging duration contained in the RRC message sent to the UE.

The MDT status information may also contain a second timestamp which is the remaining duration of the logged MDT, and the remaining duration may be the remaining duration of the signaling-based logged MDT measurement, and/or the remaining duration of the management-based logged MDT measurement.

The remaining duration of the logged MDT is related to the logging duration of the logged MDT in the MDT configuration parameters. The calculation is begun from the time when the UE is configured to perform the logged measurement, and the remaining duration is the duration of the logged MDT at the beginning. The remaining duration is not 0 until the duration of the logged MDT expires. For example, at ten o'clock in the morning of a certain day, the base station configures the UE to perform the MDT logged measurement, in which the logging duration of the MDT logged measurement is set to 2 hours. From then on, the base station begins to calculate the remaining duration. If the base station decides to release the RRC connection at eleven o'clock in the morning of the same day, the base station informs the core network that the signaling-based logged MDT has been configured for the UE, and notifies the core network that the remaining time of the signaling-based logged MDT is one hour. The remaining duration of the logged MDT can be expressed as an absolute time of 12 o'clock, or as a relative time of 60 minutes.

After receiving the MDT status information, the core network saves in the context of the UE the MDT status information, including the configuration time of the logged MDT, and sends the MDT status information to the base station if necessary when the UE enters the connected mode next time. The core network has saved the MDT configuration information. If the UE returns to the RRC connected state afterwards, the core network receives the initial UE message from the serving base station of the UE. The core network decides whether it is necessary to send the MDT status information to the serving base station of the UE according to the configuration time of the signaling-based logged MDT and the logging duration of the logged MDT in the MDT configuration information. For example, the configuration time of the signaling-based logged MDT is ten o'clock in the morning of a certain day, the logging duration of the logged MDT is two hours, and the time of the core network is twelve o'clock in the morning when the core network receives the initial UE message. According to the above time information, the core network knows that the logging time period of the signaling-based logged MDT has now passed, and the core network may not send the MDT status information to the base station. Without a new MDT configuration, the core network does not send MDT configuration parameters to the base station. If the time of the core network is eleven o'clock in the morning when the core network receives the initial UE message, the core network needs to send the MDT status information to the serving base station of the UE, and the core network can also send the MDT configuration parameters to the base station. The base station can decide whether it is possible to configure the management-based logged MDT measurement for the UE according to the status information.

After receiving the MDT status information, the core network saves the MDT status information in the context of the UE. The core network can continue to calculate the remaining duration, and sends the MDT status information to the base station if necessary when the UE enters the connected mode next time. If the UE returns to the RRC connected state within the remaining duration indicated by the base station, the core network needs to send the MDT status information to the serving base station of the UE. What is contained in the MDT status information is the remaining duration calculated by the core network. After receiving it, the base station decides whether it is possible to configure the management-based logged MDT measurement for the UE according to the remaining duration. If the UE returns to the RRC connected state after the remaining time indicated by the base station, the core network does not need to send the MDT state information to the serving base station of the UE.

It should be noted that the base station may also report the MDT status information to the core network in the UE context release completion message.

It should be noted that this method is also applicable to the UE context release procedure initiated by the core network. The core network sends a UE context release command to the base station, and the base station can indicate the MDT status information to the core network in the UE context release completion.

Step 406: The core network sends a UE context release command message to the base station.

The core network sends a dedicated message to confirm release of the UE context.

Step 407: The base station sends an RRC release message to the UE.

The base station initiates a dedicated RRC procedure to release the configuration information of the RRC connection on the UE side.

Step 408: The base station sends a UE context release completion message to the core network.

The base station sends a dedicated UE message to the core network to confirm that the UE connection is released.

Embodiment 2

FIG. 5 describes Embodiment 2 of the present disclosure. The UE enters the RRC connected mode from the idle mode, the core network sends the MDT status information to the serving base station of the UE, and the serving base station decides whether it is possible to configure the management-based logged MDT for the UE according to the MDT status information. Specifically, FIG. 5 contains the following specific steps.

Step 501: The UE sends an RRC establishment request message to the base station.

The base station can be a 3G base station, a 4G base station or a 5G base station, or a base station of other access systems. The UE initiates the establishment of the RRC connection, and sends an RRC establishment request message to the DU. The message carries the UE's temporary identity and the cause for the RRC establishment.

Step 502: The base station sends an RRC establishment message to the UE.

Step 503: The UE sends an RRC establishment completion message to the base station.

The RRC establishment completion message carries the operator identity (for example, PLMN ID) selected by the UE. The message also contains a non-access stratum message. After receiving it, the base station sends the non-access stratum message to a core network mobility function node AMF. After the RRC connection is established, the UE enters the RRC connected mode. The context information of the UE is saved on the base station.

The UE can also inform, through the RRC establishment completion message, the base station that the UE side is configured with the logged MDT measurement and how much remaining measurement time is. In this way, after receiving the information, the network can save it in the context of the UE. During the remaining measurement time, unless necessary, the logged MDT measurement is not configured so as to avoid erroneously overwriting the original measurement.

Step 504: The base station sends an initial UE message to the core network.

After the base station receives the RRC connection establishment completion message, the base station sends the "initial UE message" to the core network through the interface with the core network. The core network may be a 3G core network, a 4G core network, a 5G core network or a core network of other systems, and the message carries the non-access stratum message carried in the RRC connection establishment completion message by the UE. The message also carries the location information of the UE, for example, the unique identity of the cell, where the UE is located, in the entire network. The message contains the UE's temporary identity, which is allocated to the UE by the core network, for example, the 5G-S-TMSI allocated to the UE by the 5G core network.

Step 505: The core network sends an initial context establishment request message to the base station.

The core network receives the message of step 504, and can find the context information of the UE according to the temporary identity of the UE. Thus, the capability information of the UE is obtained. The core network sends the initial context establishment request message to the base station, and the message contains the information of the data bearer established for the UE, contains the UE's encryption capability information and radio access capability information. In the UE context, it also contains configuration parameters of the MDT and the status information of the MDT. Therefore, in this message, the message can also contain the configuration parameters of the MDT and the MDT status information, and the MDT status information can contain status indication, for example, being one or more of the following statuses:

indicating whether the MDT measurement is configured for the UE;
  indicating whether the logged MDT measurement is configured for the UE;
  indicating whether the signaling-based MDT measurement is configured for the UE;
  indicating whether the signaling-based logged MDT measurement is configured for the UE;
  indicating whether the management-based logged MDT measurement is configured for the UE.

The MDT status information may contain the unique identity of the MDT that has been configured, for example, the TR (Trace Reference), the TRSR (Trace Recording Session Reference).

The MDT status information may contain the type of MDT that has been configured, for example, the management-based logged MDT, the signaling-based logged MDT.

The MDT status information may also contain a first timestamp. The first timestamp is the configuration time of the logged MDT, for example, the configuration time of the signaling-based logged MDT. The configuration time is the absolute time of the cell when the base station sends the RRC message of the logged MDT configuration to the UE, for example, it is identified in the form of year-month-day hour-minute-second. The configuration time of the logged MDT contained in the MDT status information is the same as the time contained in the RRC message of the logged MDT configuration sent by the base station to the UE.

The MDT status information can also contain the logging duration of the logged MDT, for example, the logging duration of the signaling-based logged MDT. This logged MDT has been configured in the UE, and the parameter is sent by the core network to the base station, and sent by the base station to the UE. The value of the parameter is the same as the logging duration contained in the RRC message sent to the UE.

The MDT status information may also contain a second timestamp which is the remaining duration of the logged MDT, and the remaining duration may be the remaining duration of the signaling-based logged MDT measurement, and/or the remaining duration of the management-based logged MDT measurement.

The core network can use one of the following methods to calculate the remaining duration.

It is calculated by the core network based on the MDT status information reported by the base station. For example, at ten o'clock in the morning of a certain day, the base station configures the UE to perform MDT logged measurement in which the logging duration of the MDT logged measurement is set to 2 hours. From then on, the base station begins to calculate the remaining duration. If at half past ten in the morning of the same day, the base station decides to release the RRC connection, then the base station informs the core network that the signaling-based logged MDT has been configured for the UE, and notifies the core network of the remaining duration of the signaling-based logged MDT. For example, using the above example, the base station sends the MDT configuration information to the UE at ten o'clock in the morning, and the duration of the logged MDT is set to 2 hours. At eleven o'clock in the morning of the same day, the base station lets the UE enter the RRC idle mode, then the remaining duration of the logged MDT contained in the UE context release request message sent to the core network by the base station may be expressed as an absolute time of 12 o'clock, or as a relative time of 60 minutes. After that, the core network saves the information in the context of the UE and continues to calculate the remaining duration if necessary.
  It is calculated by the core network itself. It is calculated from the duration of the logged MDT by the core network. The core network configures the signaling-based logged MDT. Since the core network sends the MDT configuration information to the base station, the core network begins starting the calculation of the remaining MDT duration. For example, if at 10 o'clock on a certain day, the core network sends to the base station the MDT configuration information in which the duration of the logged MDT is 2 hours, then the calculation is begun from 10 o'clock. When every minute passes, the remaining time of the MDT is one minute less than 2 hours.

The remaining duration in the MDT status information can be expressed as an absolute time or as a relative time. For example, using the above example, the core network sends the MDT configuration information to the base station at 10 o'clock. After that, the UE enters the RRC idle mode and returns to the RRC connected state again before 11 o'clock. So, the remaining duration contained in the initial context establishment request message sent by the core network can be expressed as an absolute time of 12 o'clock, or as a relative time of 60 minutes.

Step 506: The base station may send a response message of success to the core network.

After receiving the message, the base station saves the information in the context of the UE.

The base station receives the MDT status information. If the MDT status information indicates that the signaling-based logged MDT measurement has been configured for the UE, and/or through the MDT status information containing the configuration time of the logged MDT and the logging duration of the logged MDT, the base station can know that the signaling-based logged MDT measurement has been configured for the UE at present, and whether the measurement time of the signaling-based logged MDT has expired, so that the base station can decide whether it is possible to configure the management-based logged MDT measurement for the UE. For example, the configuration time of the signaling-based logged MDT is ten o'clock in the morning of a certain day, and the duration of the signaling-based logged MDT is two hours. If the time of the base station is later than twelve o'clock in the morning when the initial context establishment request is received, according to the above-mentioned time information, the base station knows that the logging time period of the signaling-based logged MDT expires at present, and the base station can send the management-based logged MDT configuration to the UE. If the time of the base station is eleven o'clock in the morning when the initial context establishment request is received, the base station cannot configure the management-based logged MDT measurement for the UE. Or, if the MDT status information is not received, it means that the base station can send the management-based logged MDT configuration to the UE.

The base station receives the MDT status information. If the MDT status information indicates that the management-based logged MDT measurement has been configured for the UE, and/or the base station knows the remaining duration of the MDT from the status information. According to the MDT status information, the base station can decide whether to configure the management-based MDT measurement for the UE. For example, the remaining duration of the signaling-based logged MDT contained in the MDT status information is 60 minutes, which means that the management-based logged MDT measurement cannot be configured for the UE within 60 minutes. After that, the base station can configure the management-based logged MDT measurement for the UE as needed.

After saving the UE information, the base station sends a response message of success to the core network.

Embodiment 3

FIG. 6 describes Embodiment 3 of the present disclosure. The UE cell-reselects to a new cell. The new cell is on a new base station. The UE requests to resume the RRC connection or request RRC re-establishment. The new base station obtains the context information of the UE from the old base station. The old base station has configured the UE to perform the logged MDT measurement. The old base station sends the MDT status to the new base station, and the new base station saves it in the context of the UE, and decides whether it is possible to configure the management-based logged MDT for the UE. Specifically, FIG. 6 contains the following specific steps.

Step 601: The UE sends an RRC resume request message to the new base station.

The message may contain the identity of the UE in the old cell, and the identity of the UE in the old cell contains the information of the old base station, the C-RNTI allocated by the new cell, the physical layer identifier PCI of the new cell, and the unique identity of the new cell in the entire network.

Step 602: The new base station sends a UE context acquisition request message to the old base station.

The new base station receives the resume request message, and knows that the UE context is on the old base station through the information of the old base station contained in the message. The new base station sends the UE context acquisition request message to the old base station.

The UE context acquisition request message contains a UE context identity. For the RRC resume procedure, the UE context identity contains the identity of the UE in the old cell, the temporary C-RNTI of the UE allocated by the new cell, i.e. the cell receiving the RRC resume request, and the PCI of the new cell. The message also contains the unique cell identity of the new cell, for example, CGI, and the cause for RRC resume.

Step 603: The old base station sends a UE context acquisition response message to the new base station.

The old base station judges whether to send a response message to the new base station. If the UE context can be sent to the new base station, the old base station sends the UE context acquisition response message to the new base station. The message can contain the context information of the UE, can contain configuration parameters of the MDT, and can also contain the MDT status information. The MDT status information can contain status indication, for example, being one or more of the following statuses:

indicating whether the MDT measurement is configured for the UE;

indicating whether the logged MDT measurement is configured for the UE;

indicating whether the signaling-based MDT measurement is configured for the UE;

indicating whether the signaling-based logged MDT measurement is configured for the UE;

indicating whether the management-based logged MDT measurement is configured for the UE.

The MDT status information may contain the unique identity of the MDT that has been configured, for example, the TR (Trace Reference), the TRSR (Trace Recording Session Reference).

The MDT status information may contain the type of MDT that has been configured, for example, the management-based logged MDT, the signaling-based logged MDT.

The MDT status information may also contain a first timestamp. The first timestamp is the configuration time of the logged MDT, for example, the configuration time of the signaling-based logged MDT. The configuration time is the absolute time of the cell when the base station sends the RRC message of the logged MDT configuration to the UE, for example, it is identified in the form of year-month-day hour-minute-second. The configuration time of the logged MDT contained in the MDT status information is the same as the time contained in the RRC message of the logged MDT configuration sent by the base station to the UE.

The MDT status information can also contain the logging duration of the logged MDT, for example, the logging duration of the signaling-based logged MDT. This logged MDT has been configured in the UE, and the parameter is sent by the core network to the base station, and sent by the base station to the UE. The value of the parameter is the same as the logging duration contained in the RRC message sent to the UE.

The MDT status information may also contain a second timestamp which is the remaining duration of the logged MDT, and the remaining duration may be the remaining duration of the signaling-based logged MDT measurement, and/or the remaining duration of the management-based logged MDT measurement.

The remaining duration of the logged MDT is related to the logging duration of the logged MDT in the MDT configuration parameters. The calculation is begun from the time when the UE is configured to perform the logged measurement, and the remaining duration is the logging duration of the logged MDT at the beginning. The remaining duration is not 0 until the duration of the logged MDT expires. For example, at ten o'clock in the morning of a certain day, the old base station configures the UE to perform the MDT logged measurement, in which the logging duration of the MDT logged measurement is set to 2 hours. From then on, the old base station begins to calculate the remaining duration. If the old base station receives the UE context acquisition request message at eleven o'clock in the morning of the same day, the old base station informs the new base station that the logged MDT has been configured for the UE, and notifies the new base station of the remaining duration of the logged MDT. For example, using the above example, the old base station sends the MDT configuration information to the UE at ten o'clock in the morning, and the duration of the logged MDT is set to 2 hours. At eleven o'clock in the morning of the same day, the old base station receives the UE context acquisition request message. Thus, the remaining duration of the MDT contained in the UE context acquisition response message sent by the old base station may be expressed as an absolute time of 12 o'clock, or as a relative time of 60 minutes.

The new base station receives the MDT status information and saves the information in the context of the UE. If the MDT status information indicates that the signaling-based logged MDT measurement has been configured for the UE, and/or the new base station can know, through the MDT status information containing the configuration time of the logged MDT and the logging duration of the logged MDT, that the signaling-based logged MDT measurement has been configured for the UE at present, and whether the measurement time of the signaling-based logged MDT has expired, it can decide whether to configure the management-based logged MDT measurement for the UE. For example, the configuration time of the signaling-based logged MDT is ten o'clock in the morning of a certain day, and the duration of the signaling-based logged MDT is two hours. If when the new base station receives the initial context establishment request, the time of the new base station is later than twelve o'clock in the morning, according to the above-mentioned time information, the new base station knows that the logging time period of the signaling-based logged MDT expires at present, and the new base station can send the management-based logged MDT configuration to the UE. If the time of the new base station is eleven o'clock in the morning when the initial context establishment request is received, the new base station cannot configure the management-based logged MDT measurement for the UE. Or, if the MDT status information is not received, it means that the base station can send the management-based logged MDT configuration to the UE.

After receiving the MDT status information, the new base station saves the MDT status information in the context of the UE, and can continue to calculate the remaining duration. If the MDT status information indicates that the management-based logged MDT measurement has been configured for the UE, and/or base station knows the remaining duration of the MDT from the status information, the new base station can decide whether it is possible to configure the management-based MDT measurement for the UE according to the MDT status information. For example, the remaining duration of the signaling-based logged MDT contained in the MDT status information is 60 minutes, which means that the management-based logged MDT measurement cannot be configured for the UE within 60 minutes. After that, the new base station can configure the management-based logged MDT measurement for the UE as needed.

Step 604: The new base station sends an RRC resume response message to the UE.

Step 605: The UE sends an RRC resume completion message to the new base station.

It should be noted that this method is also applicable to the procedure of RRC re-establishment. What is needed is only to replace the corresponding messages with the messages in the RRC re-establishment procedure.

Embodiment 4

FIG. 7 describes Embodiment 4 of the present disclosure. The UE hands over to the target base station from the source base station. The source base station sends the MDT status information to the target base station, and the target base station saves the MDT status information in the context of the UE, and decides whether it is possible to configure the management-based logged MDT for the UE. Specifically, FIG. 7 contains the following specific steps.

Step 701: The source base station sends a UE handover request to the target base station.

The message may contain the identity of a target cell, the capability information of the UE, and the information of a bearer needed to be established, and the message may also contain configuration parameters of the MDT if the signaling-based MDT measurement is configured at the source base station. The message can also contain MDT status information. The MDT status information can contain status indication, for example, being one or more of the following statuses:

indicating whether the MDT measurement is configured for the UE;

indicating whether the logged MDT measurement is configured for the UE;

indicating whether the signaling-based MDT measurement is configured for the UE;

indicating whether the signaling-based logged MDT measurement is configured for the UE;

indicating whether the management-based logged MDT measurement is configured for the UE.

The MDT status information may contain the unique identity of the MDT that has been configured, for example, the TR (Trace Reference), the TRSR (Trace Recording Session Reference).

The MDT status information may contain the type of MDT that has been configured, for example, the management-based logged MDT, the signaling-based logged MDT.

The MDT status information may also contain a first timestamp. The first timestamp is the configuration time of the logged MDT, for example, the configuration time of the signaling-based logged MDT. The configuration time is the absolute time of the cell when the base station sends the RRC message of the logged MDT configuration to the UE, for example, it is identified in the form of year-month-day hour-minute-second. The configuration time of the logged MDT contained in the MDT status information is the same as the time contained in the RRC message of the logged MDT configuration sent by the base station to the UE.

The MDT status information can also contain the logging duration of the logged MDT, for example, the logging duration of the signaling-based logged MDT. This logged MDT has been configured in the UE, and the parameter is sent by the core network to the base station, and is sent by the base station to the UE. The value of the parameter is the same as the logging duration contained in the RRC message sent to the UE.

The MDT status information may also contain a second timestamp which is the remaining duration of the logged MDT, and the remaining duration may be the remaining duration of the signaling-based logged MDT measurement, and/or the remaining duration of the management-based logged MDT measurement.

The remaining duration of the logged MDT is related to the logging duration of the logged MDT in the MDT configuration parameters. The calculation is begun from the time when the UE is configured to perform the logged measurement, and the remaining duration is the duration of the logged MDT at the beginning. The remaining duration is not 0 until the duration of the logged MDT expires. For example, at ten o'clock on a certain day, the source base station configures the UE to perform the MDT logged measurement, in which the logging duration of the MDT logged measurement is set to 2 hours. From then on, the source base station begins to calculate the remaining duration. If the source base station decides to hand the UE over to the target base station at eleven o'clock in the morning of the same day, the source base station informs the target base station of the remaining duration of the logged MDT. The remaining duration of the MDT may be expressed as an absolute time of 12 o'clock, or as a relative time of 60 minutes.

The target base station receives the MDT status information and saves the information in the context of the UE. If the MDT status information indicates that the source base station has configured the signaling-based logged MDT measurement for the UE, and/or the target base station can know, through the MDT status information containing the configuration time of the logged MDT and the logging duration of the logged MDT, that the signaling-based logged MDT measurement has been configured for the UE at present, and whether the measurement time of the signaling-based logged MDT has expired, thus it can decide whether to configure the management-based logged MDT measurement for the UE. For example, the configuration time of the signaling-based logged MDT is ten o'clock in the morning of a certain day, and the duration of the signaling-based logged MDT is two hours. After twelve o'clock on the certain day, the target base station can send the management-based logged MDT configuration to the UE. Before that, the target base station cannot configure the management-based logged MDT measurement for the UE. Or, if the MDT status information is not received, it means that the target base station can send the management-based logged MDT configuration to the UE.

After receiving the MDT status information, the target base station saves the MDT status information in the context of the UE, and continues to calculate the remaining duration if necessary. If the MDT status information indicates that the management-based logged MDT measurement has been configured for the UE, and/or base station knows the remaining duration of the MDT from the status information, the target base station can decide whether to configure the management-based MDT measurement for the UE according to the MDT status information. For example, the remaining duration of the signaling-based logged MDT contained in the MDT status information is 60 minutes, which means that the management-based logged MDT measurement cannot be configured for the UE within 60 minutes. After that, the target base station can configure the management-based logged MDT measurement for the UE as needed.

Step 702: The target base station sends a handover request response message to the source base station.

Step 703: The source base station sends an RRC reconfiguration request message to the UE.

The message may contain the configuration of the handover.

Step 704: The UE sends an RRC reconfiguration completion message to the target base station.

The message may contain the information of the handover completion.

Embodiment 5

Figure 8:
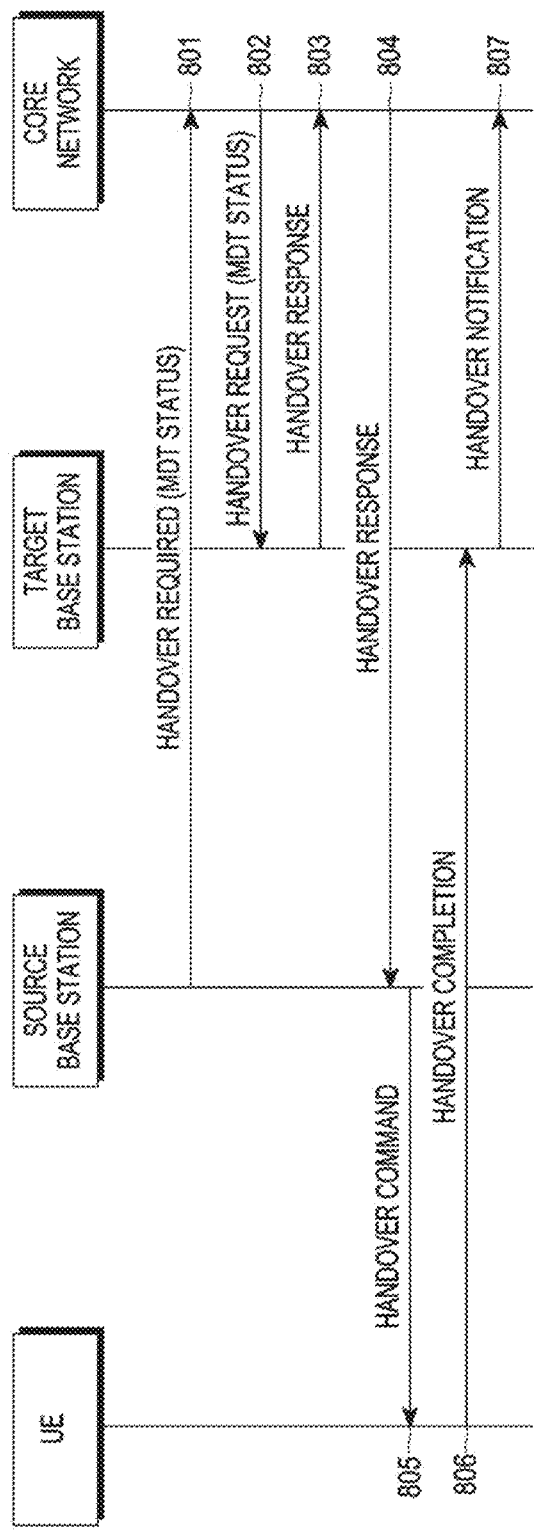
FIG. 8 is a schematic flowchart of Embodiment 5 of the present disclosure.

FIG. 8 describes Embodiment 5 of the present disclosure. Through the interface between the base station and the core network, the UE is handed over from the source base station to the target base station. The source base station sends the MDT status information to the core network, and the core network sends the MDT status information to the target base station. The target base station saves the MDT status information in the context of the UE and decides whether it is possible to configure the management-based logged MDT for the UE. Specifically, FIG. 8 contains the following specific steps.

Step 801: The source base station sends a handover required message to the core network.

The source base station decides to hand over the UE to the target base station according to the UE measurement result. The message carries the identity of the target base station or the identity of the target cell. If there is no horizontal interface connected between the source base station and the target base station, the source base station sends a handover required message to the core network.

The message can also contain the MDT status information. The MDT status information can contain status indication, for example, being one or more of the following statuses:

indicating whether the MDT measurement is configured for the UE;

indicating whether the logged MDT measurement is configured for the UE;

indicating whether the signaling-based MDT measurement is configured for the UE;

indicating whether the signaling-based logged MDT measurement is configured for the UE;

indicating whether the management-based logged MDT measurement is configured for the UE.

The MDT status information may contain the unique identity of the MDT that has been configured, for example, the TR (Trace Reference), the TRSR (Trace Recording Session Reference).

The MDT status information may contain the type of MDT that has been configured, for example, the management-based logged MDT, the signaling-based logged MDT.

The MDT status information may also contain a first timestamp. The timestamp is the configuration time of the logged MDT, for example, the configuration time of the management-based logged MDT. The configuration time is the absolute time of the cell when the base station sends the RRC message of the logged MDT configuration to the UE, for example, it is identified in the form of year-month-day hour-minute-second. The configuration time of the logged MDT contained in the MDT status information is the same as the time contained in the RRC message of the logged MDT configuration sent by the base station to the UE.

The MDT status information can also contain the logging duration of the logged MDT, for example, the logging duration of the signaling-based logged MDT. This logged MDT has been configured in the UE, and the parameter is sent by the core network to the base station, and is sent by the base station to the UE. The value of the parameter is the same as the logging duration contained in the RRC message sent to the UE.

The MDT status information may also contain a second timestamp which is the remaining duration of the logged MDT, and the remaining duration may be the remaining duration of the signaling-based logged MDT measurement, and/or the remaining duration of the management-based logged MDT measurement.

The remaining duration of the logged MDT is related to the logging duration of the logged MDT in the MDT configuration parameters. The calculation is begun from the time when the UE is configured to perform the logged measurement, and the remaining duration is the duration of the logged MDT at the beginning. The remaining duration is not 0 until the duration of the logged MDT expires. For example, at ten o'clock on a certain day, the source base station configures the UE to perform the MDT logged measurement, in which the logging duration of the MDT logged measurement is set to 2 hours. From then on, the source base station begins to calculate the remaining duration. If the source base station decides to hand over the UE to the target base station at eleven o'clock in the morning of the same day, the source base station informs the target base station of the remaining duration of the logged MDT. The remaining duration of the MDT may be expressed as an absolute time of 12 o'clock, or as a relative time of 60 minutes.

Step 802: The core network sends a handover request to the target base station.

The core network receives the message of step 801, and the core network sends the handover request to the target base station. The handover request message contains the identity of the UE at the interface and the information of the bearer to be established. The message also contains configuration parameters of the MDT. The message can also contain the MDT status information. The MDT status information is as described in step 801.

The target base station receives the MDT status information and saves the information in the context of the UE. If the MDT status information indicates that the source base station has configured the signaling-based logged MDT measurement for the UE, and/or the target base station can know, through the MDT status information containing the configuration time of the logged MDT and the logging duration of the logged MDT, that the signaling-based logged MDT measurement has been configured for the UE at present, and whether the measurement time of the signaling-based logged MDT has expired, the target base station can decide whether it is possible to configure the management-based logged MDT measurement for the UE. For example, the configuration time of the signaling-based logged MDT is ten o'clock in the morning of a certain day, and the duration of the signaling-based logged MDT is two hours. After twelve o'clock on the certain day, the target base station can send the management-based logged MDT configuration to the UE. Before that, the target base station cannot configure the management-based logged MDT measurement for the UE.

After receiving the MDT status information, the target base station saves the MDT status information in the context of the UE, and continues to calculate the remaining duration if necessary. If the MDT status information indicates that the management-based logged MDT measurement has been configured for the UE, and/or base station knows the remaining duration of the MDT from the status information, the target base station can decide whether to configure the management-based MDT measurement for the UE according to the MDT status information. For example, the remaining duration of the signaling-based logged MDT contained in the MDT status information is 60 minutes, which means that the management-based logged MDT measurement cannot be configured for the UE within 60 minutes. After that, the target base station can configure the management-based logged MDT measurement for the UE as needed.

Step 803: The target base station sends a handover response to the core network.

The message can carry the identity of the UE at the interface and the information of the accepted bearer. An RRC container in the handover response message can contain a handover command to be sent to the UE.

Step 804: The core network sends a handover command message to the source base station.

The message can confirm that the target base station has been ready for handover, and the message can also carry the identity of the UE at the interface and the information of the bearer accepted by the target base station.

Step 805: The source base station sends the handover command to the UE.

The source base station sends the handover command generated by the target base station to the UE.

Step 806: The UE synchronizes with the target cell and sends a handover completion message to the target base station.

Step 807: The target base station sends a handover notification message to the core network.

Embodiment 6

Figure 11:
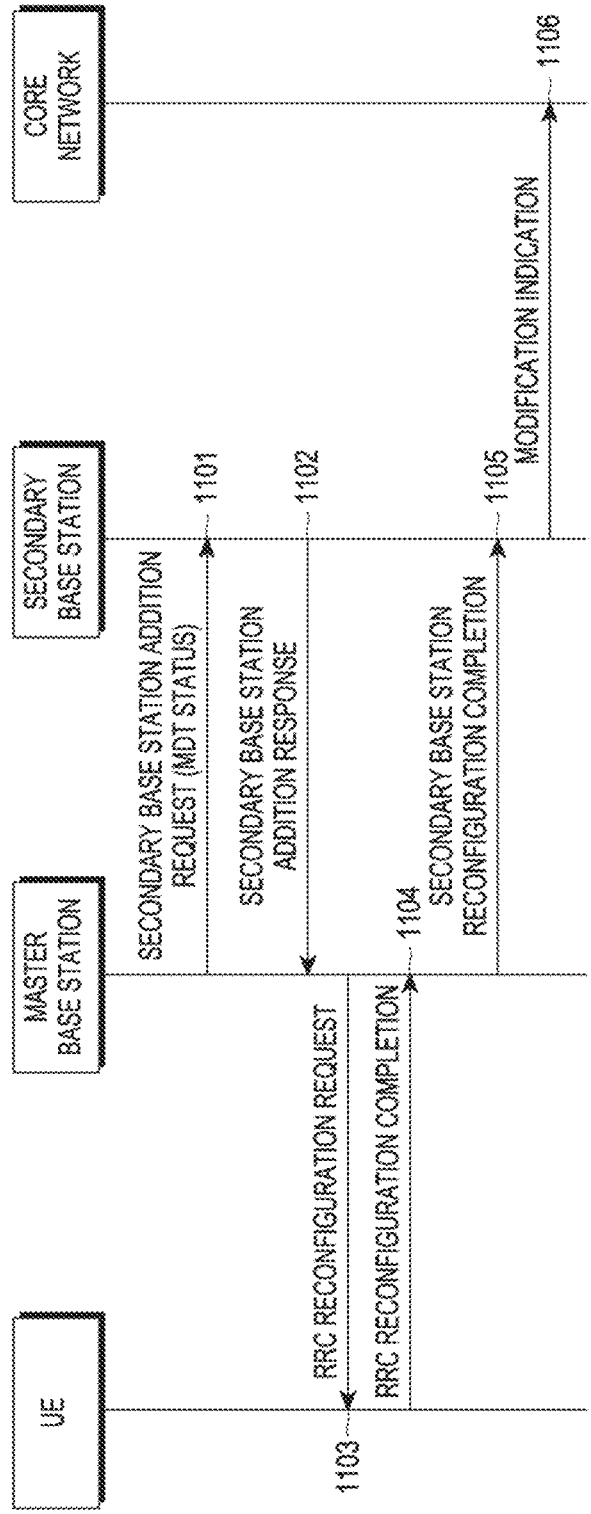
FIG. 11 is a schematic flowchart of Embodiment 6 of the present disclosure.

FIG. 11 describes Embodiment 6 of the present disclosure. The method of the present disclosure can also be used in the case of dual connectivity. When a master base station MN establishes dual connection for the UE, the master base station and a secondary base station SN can send RRC messages to the UE respectively, which means that the master base station and the secondary base station do not know whether the other side configures the MDT each other. Therefore, the MN needs to tell the SN whether the MN has configured the MDT measurement for the UE, and then the SN can refer to this information to decide whether to configure the MDT for the UE. Specifically, FIG. 11 contains the following specific steps.

Step 1101: The master base station MN sends a secondary base station addition request or secondary base station modification request message to the secondary base station SN.

The master base station/secondary base station can be an LTE base station or a 5G base station gNB. It is assumed that both the master base station and the secondary base station are connected to the core network of 5G. Both LTE base stations and 5G base stations belong to devices of a 5G access network.

The master base station decides to establish certain bearers, for example, service data flows (QOS flows), at the secondary base station. The secondary base station establishment request message or the secondary base station modification request message carries one or more of the following information:

The indication of the location where the higher layer resource is located. For example, it is indicated whether the PDCP is on the secondary base station or not. If it is not located at the secondary base station, it is identified that the PDCP is established on the master base station.

Indication of the location where the lower layer resource is located. For example, it is indicated whether the MCG RLC resource exists, whether the SCG RLC resource exists, or both exist. If both exist, it corresponds to the split RLC resource.

The list of identities of QoS flows. It corresponds to the identity of the QoS flows to be established on the secondary base station, that is, the list of identifiers of the QoS flows to be offloaded. If the master base station indicates that the PDCP is established on the secondary base station, the secondary base station can determine the mapping of these QoS flows as described above to data radio bearers. The identity of the QoS flows are sent by the core network to the master base station through the initial context establishment procedure or the initial context modification procedure.

The quality requirement parameter of QoS Flow. This information is the quality requirement corresponding to the QoS flows, and may contain the standard 5G quality requirement indication 5QI, the priority ARP, the maximum uplink/downlink rate of the GBR service, and the guaranteed uplink/downlink rate of the GBR service. Or, it contains specific parameters of the quality requirement, for example, the information such as the resource type, the priority, data delay target, the error rate and so on. The identity of QoS Flows and the corresponding quality requirement parameters are transmitted from the core network to the master base station. The master base station can send the value transferred from the core network directly to the secondary base station, or decide a new value to be sent to the secondary base station according to the value transferred from the core network.

If the master base station configures the MDT measurement for the UE, for example, configures the logged MDT. After sending the MDT measurement configuration to the UE, the master base station can delete the information of the MDT saved on the base station. However, the master base station needs to tell the MDT status information to the secondary base station, so the message can also contain the MDT status information.

The MDT status information can contain status indication, for example, being one or more of the following statuses:

indicating whether the MDT measurement is configured for the UE;
indicating whether the logged MDT measurement is configured for the UE;
indicating whether the signaling-based MDT measurement is configured for the UE;
indicating whether the signaling-based logged MDT measurement is configured for the UE;
indicating whether the management-based logged MDT measurement is configured for the UE;
indicating whether the signaling-based immediate MDT measurement is configured for the UE;
indicating whether the management-based immediate MDT measurement is configured for the UE;
indicating whether the configuration of the MDT has been released;
indicating whether the secondary base station is allowed to configure the MDT for the UE.

The MDT status information may contain the unique identity of the MDT that has been configured, for example, the TR, and the TRSR.

The MDT status information may contain the type of MDT that has been configured, for example, the management-based logged MDT, the signaling-based logged MDT, the signaling-based immediate MDT, and the management-based immediate MDT.

The MDT status information may also contain a first timestamp. The timestamp is the configuration time of the logged MDT, for example, the configuration time of the management-based logged MDT. The configuration time is the absolute time of the cell when the base station sends the RRC message of the logged MDT configuration to the UE, for example, it is identified in the form of year-month-day hour-minute-second. The configuration time of the logged MDT contained in the MDT status information is the same as the time contained in the RRC message of the logged MDT configuration sent by the base station to the UE.

The MDT status information can also contain the logging duration of the logged MDT, for example, the logging duration of the signaling-based logged MDT. This logged MDT has been configured at the UE, and the parameter is sent by the core network to the base station, and is sent by the base station to the UE. The value of the parameter is the same as the logging duration contained in the RRC message sent to the UE.

The MDT status information may also contain a second timestamp which is the remaining duration of the logged MDT, and the remaining duration may be the remaining duration of the signaling-based logged MDT measurement, and/or the remaining duration of the management-based logged MDT measurement.

The remaining duration of the logged MDT is related to the logging duration of the logged MDT in the MDT configuration parameters. The calculation is begun from the time when the UE is configured to perform the logged measurement, and the remaining duration is the duration of the logged MDT at the beginning. The remaining duration is not 0 until the duration of the logged MDT expires. For example, at ten o'clock on a certain day, the master base station configures the UE to perform the MDT logged measurement, in which the duration of the MDT logged measurement is set to 2 hours. From then on, the master base station begins to calculate the remaining duration. If the master base station decides to configure dual connection for the UE at eleven o'clock in the morning of the same day, the master base station informs the secondary base station of the remaining duration of the logged MDT. The remaining duration of the MDT may be expressed as an absolute time of 12 o'clock, or as a relative time of 60 minutes.

Step 1102: The secondary base station sends a secondary base station establishment response or secondary base station modification response message to the master base station.

The secondary base station receives the MDT status information and saves the information in the context of the UE. If the MDT status information indicates that the master base station has configured the signaling-based immediate MDT measurement for the UE, the secondary base station no longer configures the management-based immediate MDT measurement for the UE.

Alternatively, the secondary base station can know, through the configuration time of the logged MDT and the logging duration of the logged MDT contained in the MDT status information, that the signaling-based logged MDT measurement has been configured for the UE at present, and can additionally decide whether it is possible to configure the management-based logged MDT measurement for the UE based on whether the measurement time of the MDT has expired. For example, the configuration time of the signaling-based logged MDT is ten o'clock in the morning of a certain day, and the duration of the signaling-based logged MDT is two hours. After twelve o'clock on that day, the secondary base station can send the management-based logged MDT configuration to the UE. Before that, the secondary base station could not configure the management-based logged MDT measurement for the UE.

Alternatively, the MDT status information contains the remaining duration of the logged MDT. According to the MDT status information, the secondary base station can decide whether to configure the management-based logged MDT measurement for the UE. For example, the remaining duration of the signaling-based logged MDT contained in the MDT status information is 60 minutes, which means that the management-based logged MDT measurement cannot be configured for the UE within 60 minutes, and after that, the secondary base station can configure the management-based logged MDT measurement for the UE as needed.

If the MDT status information indicates that the configuration of the MDT has been released, the secondary base station can configure the MDT measurement for the UE according to its own needs. If the MDT status information indicates that the secondary base station is allowed to perform the MDT measurement on the UE, the secondary base station can configure the MDT measurement for the UE according to its own needs. If the MDT status information indicates that the secondary base station is not allowed to perform the MDT measurement on the UE, the secondary base station cannot configure the MDT measurement for the UE.

The secondary base station establishment response message or the secondary base station modification response message contains one or more of the following information:

The list of identities of QoS flows accepted by the secondary base station. For the quality flows QoS flows that the master base station decides to offload to the secondary base station, the secondary base station can decide to accept some QoS flows and reject some other QoS flows. In the secondary base station establishment response message, the secondary base station informs the master base station which QoSs are accepted and which QoS flows are rejected.

The radio bearer DRB identity established by the secondary base station. In the secondary base station establishment request message, the master base station decides that the PDCP is established on the secondary base station, and the master base station also indicates which QoS flows need to be offloaded to the secondary base station. The secondary base station can decide the mapping of QoS flows to the DRB. If the secondary base station decides to use a new mapping, the new mapping adopts a new DRB identity. The secondary base station selects a new DRB identity from available DRB identities according to the identity information of the DRB available to the secondary base station obtained in step 1101. The message of step 1102 can carry the identity of the new DRB corresponding to the QoS flow.

The RRC transparent container. In the RRC transparent container, the configuration information of the secondary base station for the UE may be contained. The master base station forwards the RRC transparent container to the UE in step 1103.

The MDT status information, which indicates whether the SN configures the MDT for the UE, for example, indicates that the SN configures the management-based logged MDT for the UE, and/or indicates that the SN configures the management-based immediate MDT for the UE. More information may be further contained. For example, the MDT status information may contain the unique identity of the MDT that has been configured, for example, the TR and the TRSR.

The MDT status information may contain the type of MDT that has been configured, for example, the management-based logged MDT, and the signaling-based logged MDT.

The MDT status information may also contain a first timestamp. The timestamp is the configuration time of the logged MDT, for example, the configuration time of the management-based logged MDT. The configuration time is the absolute time of the cell when the secondary base station sends the RRC message of the logged MDT configuration to the UE, for example, it is identified in the form of year-month-day hour-minute-second. The configuration time of the logged MDT contained in the MDT status information is the same as the time contained in the RRC message of the logged MDT configuration sent by the secondary base station to the UE.

The MDT status information can also contain the logging duration of the logged MDT, for example, the logging duration of the management-based logged MDT. This logged MDT has been configured at the UE, and the parameter is sent by the secondary base station to the UE. The value of the parameter is the same as the logging duration contained in the RRC message sent to the UE.

The MDT status information may also contain a second timestamp which is the remaining duration of the logged MDT, and the remaining duration may be the remaining duration of the signaling-based logged MDT measurement, and/or the remaining duration of the management-based logged MDT measurement.

After receiving the message, the MN can save the information in the context of the UE, and can refer to the information in the subsequent MDT configuration procedure.

Step 1103: The master base station sends an RRC reconfiguration request message to the UE.

The master base station does not parse the RRC container sent by the secondary base station, and forwards the RRC container to the UE. The master base station can add its own configuration information for the UE, and send the same to the UE together with the configuration information of the secondary base station.

Step 1104: The UE sends an RRC reconfiguration completion message to the master base station.

After the UE is successfully configured, it sends a response message to the master base station. The response message may contain both the response to the configuration information of the master base station and the response to the configuration information of the secondary base station. If necessary, the UE also needs to perform a random access procedure with a new secondary base station and synchronize with the new secondary base station. After synchronization, the secondary base station can begin to send data to the UE.

Step 1105: The master base station sends a secondary base station reconfiguration completion message to the secondary base station.

The master base station informs the secondary base station of the information that the UE side's configuration has been successful. Because the UE sends an acknowledge message to the master base station, the master base station needs to forward the acknowledge message to the secondary base station. If the master base station cannot parse the UE's response to the configuration information of the secondary base station, the master base station can also forward the UE's response to the configuration information of the secondary base station to the secondary base station in the form of an RRC container.

Step 1106: The master base station sends a modification indication message to the core network.

If the secondary base station establishes a new connection with the core network, the master base station needs to send a new downlink data receiving address to the core network. The message carries the bearer identity and the corresponding downlink data receiving address.

The description of this embodiment ends here. It should be noted that this embodiment omits some known information and known steps.

Embodiment 7

Figure 12:
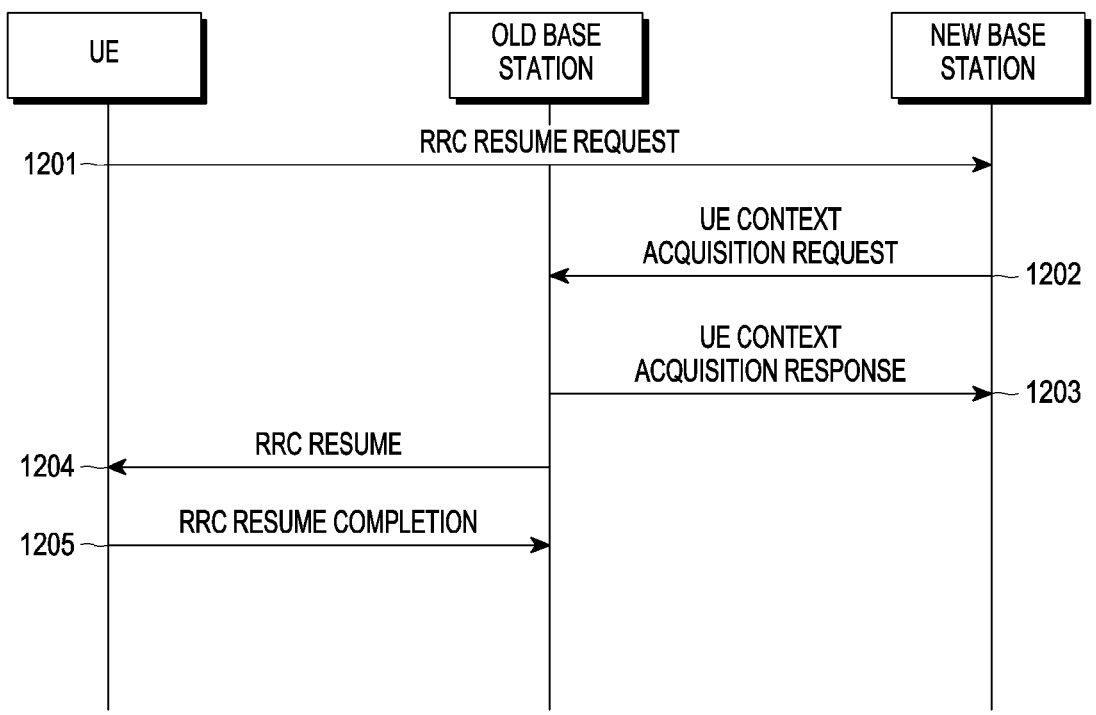
FIG. 12 is a schematic flowchart of Embodiment 7 of the present disclosure.

The method shown in FIG. 6 may also have another implementation, that is, Embodiment 7 shown in FIG. 12. The UE cell-reselects to a new cell. The new cell is on a new base station, and the UE requests to resume an RRC connection or request an RRC re-establishment. When describing sending or receiving messages, the present disclosure does not deliberately distinguish between a base station and a cell. A base station sending or receiving a message means that a cell on the base station sends or receives the message. Specifically, FIG. 12 contains the following specific steps.

Step 1201: The UE sends an RRC resume request message to the new base station.

The message contains the identity of the UE in the old cell, and the identity of the UE in the old cell contains the information of the old base station, the C-RNTI allocated by the new cell, the physical layer identity PCI of the new cell, and the unique identity of the new cell in the entire network.

Step 1202: The new base station sends a UE context acquisition request message to the old base station.

The new base station receives the resume request message, and knows that the UE context is on the old base station through the information of the old base station contained in the message. The new base station sends the UE context acquisition request message to the old base station.

The UE context acquisition request message contains a UE context identity. For the RRC resume procedure, the UE context identity contains the identity of the UE in the old cell, the temporary C-RNTI of the UE allocated by the new cell (i.e. the cell receiving the RRC resume request) and the PCI of the new cell. The message also contains the unique cell identity of the new cell, for example, CGI, and the cause for RRC resume.

Step 1203: The old base station sends a UE context acquisition response message to the new base station.

The old base station judges whether to send a response message to the new base station. If the UE context can be sent to the new base station, the old base station sends the UE context acquisition response message to the new base station. The message contains the context information of the UE. If the old base station has configured the UE to perform the logged MDT, the message can contain the MDT status information. The MDT status information may contain status indication, for example, indicating whether the signaling-based logged MDT measurement is configured for the UE. More information can also be contained, see the time stamp information described in Embodiment 3.

If the old base station has not configured the UE to perform the logged MDT, one case is that the UE enters the RRC-inactive mode at the old base station, and then receives the logged MDT configuration sent by the core network. At this time, the old base station saves the configuration information of the logged MDT in the context of the UE. When the UE later requests to resume the RRC connection at the new base station and the old base station receives the UE context acquisition request message sent by the new base station, the old base station calculates the logging duration of the MDT (MDT logging Duration) contained in the configuration information of the MDT. The old base station obtains a new logging duration according to the time when the logged MDT configuration is received from the core network and the time when the new base station requests the UE context. In other words, the old base station needs to subtract the time when the old base station saves the MDT measurement in the context of the UE from the logging duration of the logged MDT configured by the core network. For example, the base station receives the logged MDT configuration from the core network at 10 o'clock in the morning, the logging duration contained in the configuration information of the MDT is 2 hours, and the UE context request sent by the new base station is got at 11 o'clock in the morning. Thus, the old base station modifies the logging duration to 1 hour, contains the new logging duration in the MDT configuration information, and sends the MDT configuration information containing the new logging duration to the new base station through step 1203. The calculation of the new logging duration can be several predefined fixed values, for example, the logging duration can be a certain value of 10 minutes, 20 minutes, 40 minutes, 60 minutes, 90 minutes and 120 minutes, and the old base station finds the closest value as the new logging duration after calculation.

The old base station judges whether the MDT configuration is needed to continue to be saved according to the logging duration and the time saved in the UE context. If the old base station finds that the logged MDT has expired, then the old base station deletes the MDT configuration information. When the new base station requests to acquire the UE context, the MDT configuration information is not sent to the new base station.

The above example is that the UE requests to resume the RRC connection at the new base station, and the UE can also request to resume the RRC connection at the old base station. If the UE requests to resume the RRC connection at the old base station, when the old base station sends a logged MDT configuration message to the UE, recalculation of the logging duration of the logged MDT saved in the UE context is required, and a new logging duration is sent to the UE. The calculation method is shown as above.

When the new base station receives the MDT configuration information, it sends the MDT configuration information to the UE via a subsequent RRC logged MDT configuration message. The UE receives the logged MDT configuration information, and the UE starts an MDT clock. When the UE enters the RRC idle mode, the UE decides when the clock expires according to the logging duration. The clock started by the UE side and the MDT clock recorded by the core network are not started at the same time. The logging duration on the core network side and the value of the logging duration obtained by the UE are also different. However, the moment when the clock on the core network side expires and the moment when the clock on the UE side expires are the same, that is, the moments when the clocks stop are the same.

Step 1204: The new base station sends an RRC resume response message to the UE.

Step 1205: The UE sends an RRC resume completion message to the new base station.

It should be noted that this method is also used to the procedure of RRC re-establishment. What is needed is only to replace the corresponding message with the message in the RRC re-establishment procedure.

Embodiment 8

Figure 13:
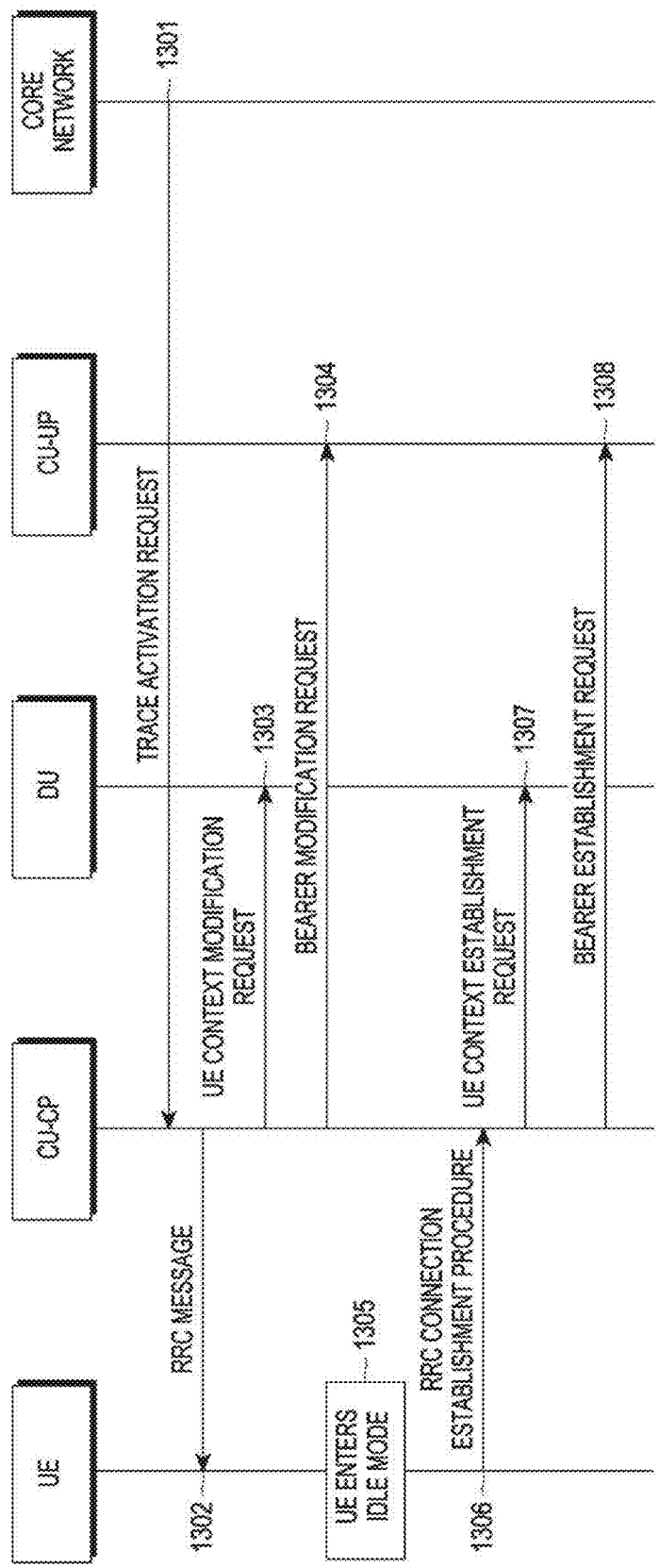
FIG. 13 is a schematic flowchart of Embodiment 8 of the present disclosure.

The method shown in FIG. 13 is another implementation, that is, Embodiment 8 shown in FIG. 13. The UE accesses a split RAN architecture. The split RAN architecture is divided into a central node (abbreviated as CU) and a distribution node (abbreviated as DU), or divided into a central control node (abbreviated as CU-CP), a central user node (abbreviated as CU-UP) and the distribution node (abbreviated as DU). FIG. 13 shows that the split RAN architecture contains a CU-CP, a CU-UP and a DU. If the split RAN architecture only contains a CU and a DU, then the functions of the CU-CP and the CU-UP are both implemented on the CU. The interaction procedure between the CU-CP and the CU-UP in FIG. 13 can be omitted and belongs to internal information interaction. The control node of the RAN knows that the UE has been configured with the logged MDT measurement, and the control node informs other nodes of the RAN that the UE has been configured with the signaling-based MDT measurement and the management-based MDT measurement is no longer performed. Or, the control node of the RAN has configured the UE or the base station to perform the MDT measurement. The control node tells the CU-UP or DU of the corresponding MDT configuration information. The CU-UP or DU no longer initiates conflicting MDT measurement. This method avoids mutual overwriting or conflicts between MDT measurements directly configured by different nodes. Specifically, FIG. 13 contains the following specific steps.

Step 1301: The CN sends a trace activation request message to the CU-CP.

Step 1302: The CU-CP sends an RRC message to the UE. The message carries the configuration information of the MDT measurement for the UE.

Step 1303: The CU-CP sends a UE context modification request message to the DU.

The message name is only exemplary, and may be other names. The message carries the MDT status information, and the MDT status information indicates the MDT status of the UE. Specifically, the MDT status information may contain one or more of the following statuses:

indicating whether the MDT measurement is configured for the UE;
indicating whether the logged MDT measurement is configured for the UE;
indicating whether the signaling-based MDT measurement is configured for the UE;
indicating whether the signaling-based logged MDT measurement is configured for the UE;
indicating whether the management-based logged MDT measurement is configured for the UE;
indicating whether the signaling-based immediate MDT measurement is configured for the UE;
indicating whether the management-based immediate MDT measurement is configured for the UE;
indicating whether the configuration of the MDT has been released;
a type indication of the RAT where the configured MDT measurement is located, for example, the eUTRA or the new access technology NR.

The DU receives the status information, and saves the status information in the context of the UE. According to the status information, the DU decides whether to select the user to perform the management-based MDT measurement. For example, if the status information indicates that the signaling-based logged MDT measurement is configured for the UE, the DU does not select the user to perform the management-based logged MDT measurement, so as to prevent the management-based logged MDT measurement from overwriting the configuration of the signaling-based logged MDT measurement. Or, if only one MDT measurement can be configured under the same RAT, and the status information indicates that the CU-CP configures a certain type of MDT measurement for the UE under a certain RAT, when the DU receives a management-based MDT measurement request message sent by an OAM of the same RAT, especially for the same measurement type, then the DU does not select the user to perform the management-based MDT measurement so as to avoid conflicts between the management-based MDT measurement and the signaling-based MDT measurement or conflicts between the MDT measurement initiated by the DU and the MDT measurement initiated by the CU-CP. Or, when the UE has been configured with the signaling-based MDT measurement, if the management-based MDT measurement cannot be performed at the same time, then the DU does not select the UE to perform the management-based measurement.

Subsequently, the DU sends a response message to the CU-CP. The response message is omitted in FIG. 13.

Step 1304: The CU-CP sends a bearer modification request message to the CU-UP.

The message name is only exemplary, and may be other names. The message carries the MDT status information, and the MDT status information indicates the MDT status of the UE. Specifically, the MDT status information may contain one or more of the following statuses:

indicating whether the MDT measurement is configured for the UE;
indicating whether the logged MDT measurement is configured for the UE;
indicating whether the signaling-based MDT measurement is configured for the UE;
indicating whether the signaling-based logged MDT measurement is configured for the UE;
indicating whether the management-based logged MDT measurement is configured for the UE;
indicating whether the signaling-based immediate MDT measurement is configured for the UE;
indicating whether the management-based immediate MDT measurement is configured for the UE;
indicating whether the configuration of the MDT has been released;
a type indication of the RAT where the configured MDT measurement is located, for example, the eUTRA or the new access technology NR.

The CU-UP receives the status information, and saves the status information in the context of the UE. According to the status information, the CU-UP decides whether to select the user to perform the management-based MDT measurement. For example, if the status information indicates that the signaling-based logged MDT measurement is configured for the UE, the CU-UP does not select the user to perform the management-based logged MDT measurement, so as to avoid the management-based logged MDT measurement from overwriting the configuration of the signaling-based logged MDT measurement. Or, if only one MDT measurement can be configured under the same RAT, and the status information indicates that the CU-CP configures a certain type of MDT measurement for the UE under a certain RAT, when the CU-UP receives a management-based MDT measurement request message sent by an OAM of the same RAT, especially for the same measurement type, the CU-UP does not select the user to perform the management-based MDT measurement so as to avoid conflicts between the management-based MDT measurement and the signaling-based MDT measurement or conflicts between the MDT measurement initiated by the CU-UP and the MDT measurement initiated by the CU-CP. Or, when the UE has been configured with the signaling-based MDT measurement, if the management-based MDT measurement cannot be performed at the same time, the CU-UP does not select the UE to perform the management-based measurement.

Subsequently, the CU-UP sends a response message to the CU-CP. The response message is omitted in FIG. 13.

Step 1305: The UE is in the idle mode. The procedure of entering the idle mode is the same as the current one, so it is omitted here. Before the UE enters the idle mode, the network configures the UE to perform the MDT measurement. When the MDT measurement is configured, the UE may be informed of the information that the MDT measurement is the signaling-based MDT measurement or the management-based MDT measurement, or like the current mechanism, the UE does not know this information, which does not affect the following steps.

Step 1306: The UE enters the connected mode. In the procedure of RRC connection establishment, the UE sends an indication message that the MDT record exists to the CU-CP, or the UE indicates an indication message that the MDT has been configured to the CU-CP, or the UE indicates that there is an ongoing MDT measurement to CU-CP.

Step 1307: The CU-CP sends a UE context establishment request message to the DU.

The message name is only exemplary, and may be other names. The message carries the MDT status information, and the MDT status information indicates the MDT status of the UE. Specifically, the MDT status information may contain one or more of the following statuses:

indicating whether the MDT measurement is configured for the UE;

indicating whether the logged MDT measurement is configured for the UE;

indicating whether the signaling-based MDT measurement is configured for the UE;

indicating whether the signaling-based logged MDT measurement is configured for the UE;

indicating whether the management-based logged MDT measurement is configured for the UE;

indicating whether the signaling-based immediate MDT measurement is configured for the UE;

indicating whether the management-based immediate MDT measurement is configured for the UE;

indicating whether the configuration of the MDT has been released;

a type indication of the RAT where the configured MDT measurement is located, for example, CUTRA or the new access technology NR.

The DU receives the status information, and saves the status information in the context of the UE. According to the status information, the DU decides whether to select the user to perform the management-based MDT measurement. For example, if the status information indicates that the signaling-based logged MDT measurement is configured for the UE, the DU does not select the user to perform the management-based logged MDT measurement, so as to prevent the management-based logged MDT measurement from overwriting the configuration of the signaling-based logged MDT measurement. Or, if only one MDT measurement can be configured under the same RAT, and the status information indicates that the CU-CP configures a certain type of MDT measurement for the UE under a certain RAT, when the DU receives a management-based MDT measurement request message sent by an OAM of the same RAT, especially for the same measurement type, the DU does not select the user to perform the management-based MDT measurement so as to avoid conflicts between the management-based MDT measurement and the signaling-based MDT measurement or conflicts between the MDT measurement initiated by the DU and the MDT measurement initiated by the CU-CP. Or, when the UE has been configured with the signaling-based MDT measurement, if the management-based MDT measurement cannot be performed at the same time, the DU does not select the UE to perform the management-based measurement.

Subsequently, the DU sends a response message to the CU-CP. The response message is omitted in FIG. 13.

Step 1308: The CU-CP sends a bearer establishment request message to the CU-UP.

The CU-CP sends a bearer modification request message to the CU-UP.

The message name is only exemplary, and may be other names. The message carries the MDT status information, and the MDT status information indicates the MDT status of the UE. Specifically, the MDT status information may contain one or more of the following statuses:

indicating whether the MDT measurement is configured for the UE;

indicating whether the logged MDT measurement is configured for the UE;

indicating whether the signaling-based MDT measurement is configured for the UE;

indicating whether the signaling-based logged MDT measurement is configured for the UE;

indicating whether the management-based logged MDT measurement is configured for the UE;

indicating whether the signaling-based immediate MDT measurement is configured for the UE;

indicating whether the management-based immediate MDT measurement is configured for the UE;

indicating whether the configuration of the MDT has been released;

a type indication of the RAT where the configured MDT measurement is located, for example, the eUTRA or the new access technology NR.

The CU-UP receives the status information, and saves the status information in the context of the UE. According to the status information, the CU-UP decides whether to select the user to perform the management-based MDT measurement. For example, if the status information indicates that the signaling-based logged MDT measurement is configured for the UE, the CU-UP does not select the user to perform the management-based logged MDT measurement, so as to prevent the management-based logged MDT measurement from overwriting the configuration of the signaling-based logged MDT measurement. Or, if only one MDT measurement can be configured under the same RAT, and the status information indicates that the CU-CP configures a certain type of MDT measurement for the UE under a certain RAT, when the CU-UP receives a management-based MDT measurement request message sent by an OAM of the same RAT, especially for the same measurement type, the CU-UP does not select the user to perform the management-based MDT measurement so as to avoid conflicts between the management-based MDT measurement and the signaling-based MDT measurement or conflicts between the MDT measurement initiated by the CU-UP and the MDT measurement initiated by the CU-CP. Or, when the UE has been configured with the signaling-based MDT measurement, if the management-based MDT measurement cannot be performed at the same time, the CU-UP does not select the UE to perform the management-based measurement.

Subsequently, the CU-UP sends a response message to the CU-CP. The response message is omitted in FIG. 13.

It should be noted that the MDT status can indicate a type indication of the RAT where the configured MDT measurement is located, which is also applicable to the previous embodiments, for example, Embodiment 1 to Embodiment 7. If only one MDT measurement can be configured under the same RAT, it is judged whether the UE can be selected to perform the MDT measurement according to the information of the RAT contained in the MDT status.

Embodiment 9

The method shown in FIG. 14 is another implementation, that is, Embodiment 9 shown in FIG. 14. The UE accesses a split RAN architecture. The split RAN architecture is divided into a central node (abbreviated as CU) and a distribution node (abbreviated as DU), or divided into a central control node (abbreviated as CU-CP), a central user node (abbreviated as CU-UP) and the distribution node (abbreviated as DU). FIG. 14 shows that the split RAN architecture contains a CU-CP, a CU-UP and a DU. If the split RAN architecture only contains a CU and a DU, the functions of the CU-CP and the CU-UP are implemented on the CU. The interaction procedure between the CU-CP and the CU-UP in FIG. 14 can be omitted, and belongs to internal information interaction. The core network configures the UE to perform the signaling-based MDT measurement. If the node of the RAN configures the management-based MDT measurement, the CU-CP can reject the management-based MDT measurement. Through the method of the present disclosure, it can be avoided that the MDT configuration of the DU overwrites the MDT configuration of the core network or the MDT configuration of the CU-CP, conflicts between the MDT configuration of the DU and the MDT configuration of the CU-CP can be avoided, and it can be avoided that the MDT configuration of the DU goes beyond the capability of the UE. Specifically, FIG. 14 contains the following specific steps.

Step 1401: The DU sends a message related to the MDT configuration to the CU-CP.

The OAM on the DU initiates the management-based MDT measurement. According to the configuration information of the MDT measurement, the DU selects a certain user to perform the MDT measurement. For example, the DU will select the UE authorized to perform the MDT measurement and located within a certain range to perform the MDT measurement. For some immediate measurements, for example, M5, or logged measurements, the measurement is to be also performed at the CU-UP, or the logged measurement is to be performed at the UE. The DU needs to send the configuration information of the MDT to the CU-UP or the UE via the CU-CP. The DU sends a message to the CU-CP. For example, the DU sends a UE context modification required message, or sends an RRC message transmission, or the DU sends a Trace activation message to the CU-CP.

The message carries one of the following information:
An RRC message to be sent to the UE, or a container containing the RRC message. The RRC message contains the measurement configuration for the UE.
Information of the MDT, for example, the identity of the MDT Trace ID, or the mode of the MDT, for example, the immediate MDT measurement or the logged MDT measurement. It can also contain the measurement type of the MDT, for example, M1, M4, etc.
Indication information of the MDT configuration, for example, indicating that the DU initiates management-based MDT configuration.

After receiving the message, the CU-CP judges whether there is a conflict with the MDT measurement configured by the CU-CP, or judges whether the management-based MDT overwrites the signaling-based MDT configuration, or judges whether the UE is capable of performing the configured measurement, through the information of the MDT contained in the message, for example, the indication information of the MDT configuration, or the measurement type of the MDT. For example, according to the report of the UE, the CU-CP can learn whether the UE has been configured with the logged MDT measurement. Then, the CU-CP receives the message of step 1401, and can judge whether the management-based logged measurement configured by the DU will overwrites the logged MDT that has been configured to the UE. If there is such a risk, the CU-CP can reject the MDT measurement initiated by the DU and send a message of step 1404 to the DU. If the CU-CP judges that there is no conflict and the UE is capable of performing the MDT measurement, the CU-CP sends an MDT measurement configuration message to the UE, and if necessary, the UE sends a response message of success to the DU. If there is a conflict or the UE's capability is insufficient, the CU-CP does not configure the UE or does not configure the CU-UP to perform the MDT measurement, and the CU-CP performs the message of step 1404.

Step 1402: The CU-CP sends a message related to the MDT configuration to the CU-UP or to the UE.

If the CU-UP is needed to perform the MDT measurement, the CU-CP sends a Trace activation request to the CU-UP. The Trace activation request message contains the identity of the MDT Trace ID and the mode of the MDT, for example, the immediate MDT measurement, and also contains the measurement type of the MDT, for example, M5, M4, etc. If the UE is needed to perform the MDT measurement, the CU-CP sends an RRC message carrying the configuration information of the MDT measurement to the UE.

Step 1403: The DU sends a Cell Traffic Trace message to the CU-CP.

After the DU selects a user to perform the management-based MDT measurement, the DU needs to send the Cell Traffic Trace message to the CU-CP. The purpose of the message is to make the CU-CP send the Cell Traffic Trace message to the core network. The message carries the identity of the MDT Trace ID, the mode of the MDT, the measurement type of the MDT and so on.

It should be noted that the messages of step 1401 and step 1402 may not occur, and the message of step 1403 may be sent without the messages of steps 1401 and 1402.

Step 1404: The CU-CP sends a Trace failure message to the DU.

In order to prevent the management-based MDT measurement from overwriting the signaling-based MDT measurement, or avoid conflicts between the configurations of the CU-CP and the DU, or prevent the MDT measurement configuration of the DU from going beyond the capability of the UE, the CU-CP can reject the management-based MDT measurement initiated by the DU. The CU-CP sends a message to the DU. For example, the message can be a UE context modification failure message or a Trace failure message. The message indicates that the cause for the failure is that the signaling-based MDT measurement has been configured, or indicates that the UE's capability is insufficient or the MDT capability is insufficient, or the configuration initiated by the DU conflicts with the configuration of the CU-CP. After receiving the message, the DU no longer performs the corresponding MDT measurement.

The above procedure is also applicable to the MDT measurement initiated by the CU-UP. What is required is only to replace the interaction procedure between the DU and the CU-CP with the interaction procedure between the CU-UP and the CU-CP, which is omitted here.

Embodiment 10

The method shown in FIG. 15 is another implementation, that is, Embodiment 10 shown in FIG. 15. FIG. 15 shows dual connectivity. Under the dual connectivity, both the master base station MN and the secondary base station SN can configure the UE to perform the MDT measurements. The master base station can perform configuration of the signaling-based and management-based MDT, and the secondary base station can perform configuration of the management-based MDT. How to ensure that the configurations of the MN and the SN do not conflict with each other is described in this embodiment. Through the method of the present disclosure, it can be avoided that the MDT configuration of the SN overwrites the MDT configuration of the MN, and conflicts with the MDT configuration of the MN, and the MDT configuration goes beyond the capability of the UE. Specifically, FIG. 15 contains the following specific steps.

Step 1501: The SN sends a message related to the MDT configuration to the MN.

The OAM on the SN initiates the management-based MDT measurement. According to the configuration information of the MDT measurement, the SN selects a certain user to perform the MDT measurement. For example, the SN will select the UE authorized to perform the MDT measurement and located within a certain range to perform the MDT measurement. For some immediate measurements, for example, M1, or logged measurements, the measurement is performed on the UE side, and the SN needs to configure the UE to perform the corresponding measurement. First, the SN needs to send an RRC message containing the MDT configuration to the user. If the SN has established an RRC signaling connection between the SN and the UE, for example, SRB3, the MDT configuration can be sent to the UE through SRB3. If SRB3 is not established, or in order to let the MN know that the SN configures the management-based MDT measurement, the SN sends a message to the MN. For example, the SN sends an SN modification required message, or sends an RRC message transmission, or the SN sends a Trace activation message to the MN.

The message carries one of the following information:
An RRC message to be sent to the UE, or a container containing the RRC message. The RRC message contains the measurement configuration for the UE.

The identity of the MDT Trace ID, the mode of the MDT, for example, the immediate MDT measurement or the logged MDT measurement, also containing the measurement type of the MDT, for example, M1, M4, etc.

Indication information of the MDT configuration, for example, indicating that the SN initiates the management-based MDT configuration.

After receiving the message, the MN judges whether there is a conflict with the MDT measurement configured by the MN, or judges whether the management-based MDT configuration overwrites the signaling-based MDT configuration, or judges whether the UE is capable of performing the configured measurement, through the information of the MDT contained in the message, for example, the indication information of the MDT configuration, or the measurement type of the MDT. If there is no conflict and the UE is capable of performing the MDT measurement, the MN sends a measurement configuration message to the UE, and sends, if necessary, a response message of success to the SN. If there is a conflict or the UE's capability is insufficient, the MN sends a message of step 1503.

Step 1502: The SN sends a Cell Traffic Trace message to the MN.

After the SN selects a user to perform the management-based MDT measurement, the SN needs to send the Cell Traffic Trace message to the MN. The purpose of the message is to make the MN send the Cell Traffic Trace message to the core network. The message carries the identity of the MDT Trace ID, the mode of the MDT, the measurement type of the MDT and so on.

It should be noted that the message of step 1501 may not be sent, and the message of step 1502 may be sent without the message of step 1501.

The MN receives the message of step 1502, and judges whether there is a conflict with the MDT measurement configured by the MN, or judges whether the management-based MDT configuration overwrites the signaling-based MDT configuration, or judges whether the UE is capable of performing the configured measurement, through the information of the MDT contained in the message, for example, the measurement type of the MDT. If there is no conflict and the UE is capable of performing the MDT measurement, the MN sends a measurement configuration message to the UE, and sends, if necessary, a response message of success to the SN. If there is a conflict or the UE's capability is insufficient, the MN performs the operation of step 1503.

Step 1503: The MN sends a message to the SN.

In order to prevent the management-based MDT measurement from overwriting the signaling-based MDT measurement, or avoid the conflict between the configurations of the SN and the MN, or prevent the MDT measurement from going beyond the capability of the UE, the MN can reject the management-based MDT measurement initiated by the SN, and the MN sends a message to the SN. For example, the message can be an RRC transmission failure message, or an SN configuration failure message, or a Trace failure message. The message indicates that the cause for the failure is that the signaling-based MDT measurement has been configured, or indicates that the UE's capability is insufficient or the MDT capacity is insufficient. After receiving the message, the SN no longer performs the corresponding MDT measurement, and/or sends a message to the UE through SRB3 to delete the MDT measurement that has been configured on the UE side.

FIG. 9 schematically shows a structural block diagram of an access network node that performs MDT measurement according to an exemplary embodiment of the present disclosure. As shown in FIG. 9, the access network node receives configuration parameters of the MDT and/or the MDT status information, the access network node decides whether it is possible to configure the management-based logged MDT measurement for the UE according to the MDT status information, and the access network node can also send the MDT status information to the core network or another access network node.

FIG. 16 illustrates a structure of a base station (BS) according to an embodiment of the present disclosure.

Base stations and nodes (e.g., second node) described above with reference to FIGS. 1 through 15 may correspond to a BS 1600 in FIG. 16.

Referring to FIG. 16, the BS 1600 may include a transceiver 1620, and a processor 1610. According to the above-described communication method of the BS 1600, the transceiver 1620, and the processor 1610 of the BS 1600 may operate. However, components of the BS 1600 are not limited to the above-described example. For example, the BS 1600 may include components that are more than or less than the above-described components. Moreover, the transceiver 1620 and the processor 1610 may be implemented in a single chip form. The processor 1610 may include one or more processors.

The transceiver 1620 may collectively refer to a receiver and a transmitter of the BS 1600, and may transmit and receive a signal to and from a core network 1700, UE, or other base stations.

The processor 1610 may control a series of processes such that the BS 1600 operates according to the above-described embodiment of the present disclosure. For example, the processor 1610 may receive a control signal and a data signal through the transceiver 1620 and process the received control signal and data signal. The processor 1610 may transmit the processed control signal and data signal through the transceiver 1620. The processor 1610 may be provided in plural and may perform an operation of controlling components of the BS 1600 by executing a program stored in a memory. The processor 1610 may control the transceiver 1620 to operate according to an embodiment of the present disclosure.

FIG. 17 illustrates a structure of a core network according to an embodiment of the present disclosure.

Core network and nodes (e.g., first node or third node) described above with reference to FIGS. 1 through 15 may correspond to a core network 1700 in FIG. 17.

Referring to FIG. 17, the core network 1700 may include a transceiver 1720, and a processor 1710. According to the above-described communication method of the core network 1700, the transceiver 1720, and the processor 1710 of the core network 1700 may operate. However, components of the core network 1700 are not limited to the above-described example. For example, the core network 1700 may include components that are more than or less than the above-described components. Moreover, the transceiver 1720 and the processor 1710 may be implemented in a single chip form. The processor 1710 may include one or more processors.

The transceiver 1720 may collectively refer to a receiver and a transmitter of the core network 1700, and may transmit and receive a signal to and from a BS 1600, UE, or other nodes.

The processor 1710 may control a series of processes such that the core network 1700 operates according to the above-described embodiment of the present disclosure. For example, the processor 1710 may receive a control signal and a data signal through the transceiver 1720 and process the received control signal and data signal. The processor 1710 may transmit the processed control signal and data signal through the transceiver 1720. The processor 1710 may be provided in plural and may perform an operation of controlling components of the core network 1700 by executing a program stored in a memory. The processor 1710 may control the transceiver 1720 to operate according to an embodiment of the present disclosure.

The above described are only the preferred embodiments of the present disclosure and are not intended to limit the present disclosure. Any modification, equivalent replacement, improvement, etc. made within the spirit and principle of the present disclosure shall be contained within the scope of protection of the present disclosure.

The invention claimed is:

1. A second node in a wireless communication system, comprising:
a transceiver;
at least one processor coupled to the transceiver,
wherein the at least one processor is configured to:
receive, from a first node, minimization of drive tests (MDT) status information;
decide whether a management-based logged MDT measurement for a user equipment (UE) is to be configured or a signaling-based logged MDT measurement is to be configured for the UE, based on the MDT status information, and
in case that the management-based logged MDT measurement is to be configured for the UE, receive an MDT activation request message from a third node.

2. The second node of claim 1, wherein the at least one processor is further configured to:
in case that the signaling-based logged MDT measurement is to be configured for the UE, receive the MDT activation request message from the first node.

3. The second node of claim 1, wherein the first node is one of a base station control node, a base station distribution node, a master base station, a core network, or a secondary base station,
wherein the second node is one of a base station control node, a base station distribution node, a master base station, or a secondary base station, and
wherein the third node is an operation and maintenance node.

4. The second node of claim 1, wherein the MDT status information contains indication information, and
wherein the indication information indicates at least one of:
an MDT measurement is to be configured for the UE,
a logged MDT measurement is to be configured for the UE,
a signaling-based MDT measurement is to be configured for the UE,
the signaling-based logged MDT measurement is to be configured for the UE, or
the management-based logged MDT measurement is to be configured for the UE.

5. The second node of claim 1, wherein the MDT status information further contains at least one of:
a unique identity of an MDT, a type of the MDT that has been configured, a configuration time of a logged MDT, a logging duration of the logged MDT, or a remaining duration of the logged MDT.

6. The second node of claim 1, wherein the at least one processor is further configured to:
obtain the MDT status information; and
send the MDT status information to the first node.

7. A first node in a wireless communication system, comprising:
a transceiver;
at least one processor coupled to the transceiver,
wherein the at least one processor is configured to:
determine minimization of drive tests (MDT) status information; and
send, to a second node, the MDT status information including at least one indication information which indicates a management-based logged MDT measurement for a user equipment (UE) is to be configured or a signaling-based logged MDT measurement is to be configured for the UE,
wherein, in case that the management-based logged MDT measurement is to be configured for the UE, the second node receives an MDT activation request message from a third node.

8. The first node of claim 7, wherein, in case that the signaling-based logged MDT measurement is to be configured for the UE, the at least one processor is further configured to:
transmit the MDT activation request message to the second node.

9. The first node of claim 7, wherein the first node is one of a base station control node, a base station distribution node, a master base station, a core network, or a secondary base station,
wherein the second node is one of a base station control node, a base station distribution node, a master base station, or a secondary base station, and
wherein the third node is an operation and maintenance node.

10. The first node of claim 7, wherein the MDT status information contains indication information,
wherein the indication information indicates at least one of:
an MDT measurement is to be configured for the UE,
a logged MDT measurement is to be configured for the UE,
a signaling-based MDT measurement is to be configured for the UE,
the signaling-based logged MDT measurement is to be configured for the UE, or
the management-based logged MDT measurement is to be configured for the UE.

11. The first node of claim 7, wherein the MDT status information further contains at least one of:
a unique identity of an MDT, a type of the MDT that has been configured, a configuration time of the logged MDT, a logging duration of a logged MDT, or a remaining duration of the logged MDT.

12. A base station in a wireless communication system, comprising:
a transceiver; and
at least one processor coupled to the transceiver,
wherein the at least one processor is configured to:
receive, from a core network, an initial context establishment request message including information associated to minimization of drive tests (MDT) measurement,
send, to a user equipment (UE), MDT configuration information,
send, to the core network, a UE context release request including MDT status information, and
receive, from the core network, a UE context release command message.

13. The base station of claim 12, wherein the MDT configuration information includes at least one of:
identity of MDT measurement, identity of trace collection entity (TCE), trace recording session reference (TRSR), MDT measurement area configuration, a network timestamp, duration of the MDT measurement, or information indicating whether a type of reporting is periodic or event triggered.

14. The base station of claim 12, wherein the MDT status information includes information indicating at least one of:
an MDT measurement is to be configured for the UE,
a logged MDT measurement is to be configured for the UE,
a signaling-based MDT measurement is to be configured for the UE,
a signaling-based logged MDT measurement is to be configured for the UE, or
a management-based logged MDT measurement is to be configured for the UE.

15. The base station of claim 12, wherein the MDT status information contains at least one of:
a unique identity of an MDT,
a type of the MDT that has been configured,
a configuration time of a logged MDT,
a logging duration of the logged MDT, or
a remaining duration of the logged MDT.

16. A core network in a wireless communication system, comprising:
a transceiver; and
at least one processor coupled to the transceiver,
wherein the at least one processor is configured to:
send, to a base station, an initial context establishment request message including information associated to minimization of drive tests (MDT) measurement,
receive, from the base station, a UE context release request including MDT status information, and
transmit, to the base station, a UE context release command message.

17. The core network of claim 16, wherein the MDT status information includes information indicating at least one:
an MDT measurement is to be configured for the UE,
a logged MDT measurement is to be configured for the UE,
a signaling-based MDT measurement is to be configured for the UE,
a signaling-based logged MDT measurement is to be configured for the UE, or
the management-based logged MDT measurement is to be configured for the UE.

18. The core network of claim 16, wherein the MDT status information contains at least one of:
a unique identity of an MDT,
a type of the MDT that has been configured,
a configuration time of a logged MDT,
a logging duration of the logged MDT, or
a remaining duration of the logged MDT.

* * * * *